(12) United States Patent
Li et al.

(10) Patent No.: US 12,172,249 B2
(45) Date of Patent: Dec. 24, 2024

(54) CARBIDE BLADE CUTTER HEAD FILLING DEVICE AND METHOD

(71) Applicants: QINGDAO UNIVERSITY OF TECHNOLOGY, Shandong (CN); NINGBO SANHAN ALLOY MATERIAL CO., LTD., Zhejiang (CN)

(72) Inventors: Changhe Li, Qingdao (CN); Shuo Yin, Qingdao (CN); Liang Luo, Qingdao (CN); Weixi Ji, Qingdao (CN); Binhui Wan, Qingdao (CN); Cong Mao, Qingdao (CN); Haogang Li, Qingdao (CN); Huajun Cao, Qingdao (CN); Bingheng Lu, Qingdao (CN); Lizhi Tang, Qingdao (CN); Xin Cui, Qingdao (CN); Mingzheng Liu, Qingdao (CN); Yanbin Zhang, Qingdao (CN); Jie Xu, Qingdao (CN); Huiming Luo, Qingdao (CN); Haizhou Xu, Qingdao (CN); Min Yang, Qingdao (CN); Huaping Hong, Qingdao (CN); Teng Gao, Qingdao (CN); Yuying Yang, Qingdao (CN); Wuxing Ma, Qingdao (CN); Shuai Chen, Qingdao (CN)

(73) Assignees: QINGDAO UNIVERSITY OF TECHNOLOGY NINGBO SANHAN ALLOY MATERIAL CO., LTD., Qingdao (CN); NINGBO SANHAN ALLOY MATERIAL CO., LTD., Ningbo (CN)

(*) Notice: Subject to any disclaimer, the term of this patent is extended or adjusted under 35 U.S.C. 154(b) by 811 days.

(21) Appl. No.: 17/340,945

(22) Filed: Jun. 7, 2021

(65) Prior Publication Data
US 2022/0055161 A1 Feb. 24, 2022

(30) Foreign Application Priority Data

Aug. 19, 2020 (CN) .......................... 202010838359.1

(51) Int. Cl.
B23P 15/28 (2006.01)
B65G 47/04 (2006.01)

(52) U.S. Cl.
CPC .............. *B23P 15/28* (2013.01); *B65G 47/04* (2013.01); *B65G 2813/00* (2013.01)

(58) Field of Classification Search
None
See application file for complete search history.

(56) References Cited

U.S. PATENT DOCUMENTS 8,733,539 B2 * 5/2014 Choy ...................... B65G 27/02
198/759
11,078,028 B1 * 8/2021 Groves .................. B65G 27/02
(Continued)

FOREIGN PATENT DOCUMENTS

| CN | 201686029 U | 12/2010 |
| CN | 202938719 U | 5/2013 |

(Continued)

OTHER PUBLICATIONS

Jun. 30, 2021 Office Action issued in Chinese Patent Application No. 202010838359.1.

*Primary Examiner* — Kavel Singh
(74) *Attorney, Agent, or Firm* — JCIPRNET

(57) ABSTRACT

The present disclosure provides a carbide blade cutter head filling device and method, and relates to the field of alloy blade processing. The carbide blade cutter head filling device includes a feeding unit, a storage unit, a loading unit and a discharging unit which are arranged successively. The output end of the feeding unit is matched with the input end of the storage unit through the guide mechanism. The output
(Continued)

end of the storage unit faces a conveying tray of the loading unit. The conveying tray is provided with a plurality of group of transition holes for accommodating blades. A receiving mechanism for accommodating a cutter head is arranged below the falling pull plate of the discharging unit. The falling pull plate adjusts the communication and isolation between the transition hole and the cutter head in the receiving mechanism by changing the relative position of the falling pull plate and the transition hole. A function of automatically feeding and loading the cutter head is fulfilled, the scattered blades are loaded into the cutter heads in batches instead of manually completing repeated work in a process of loading the blade into the cutter head. Therefore, the labor intensity of workers is reduced, the production efficiency is improved, and the blade production cost is reduced.

8 Claims, 16 Drawing Sheets

(56) References Cited

U.S. PATENT DOCUMENTS 11,691,239 B2 * 7/2023 Yang .................. B24B 3/36 451/5

11,905,128 B2 * 2/2024 Nicholson .............. B65G 47/74

FOREIGN PATENT DOCUMENTS

| | | |
|---|---|---|
| CN | 103266434 A | 8/2013 |
| CN | 103433753 A | 12/2013 |
| CN | 103482108 A | 1/2014 |
| CN | 103482112 A | 1/2014 |
| CN | 206307297 U | 7/2017 |
| CN | 206939786 U | 1/2018 |
| CN | 207239668 U | 4/2018 |
| CN | 108381274 A | 8/2018 |
| CN | 108528823 A | 9/2018 |
| CN | 207982547 U | 10/2018 |
| CN | 208278952 U | 12/2018 |
| CN | 208499696 U | 2/2019 |
| CN | 208556626 U | 3/2019 |
| CN | 208744541 U | 4/2019 |
| CN | 110342443 A | 10/2019 |
| CN | 110497185 A | 11/2019 |
| CN | 110861920 A | 3/2020 |
| CN | 110920977 A | 3/2020 |
| JP | 2011-026100 A | 2/2011 |
| TW | 201033097 A | 9/2010 |

* cited by examiner

Partial view i

Partial view ii

B-B

Partial view ix

Partial view viii

Partial view vii

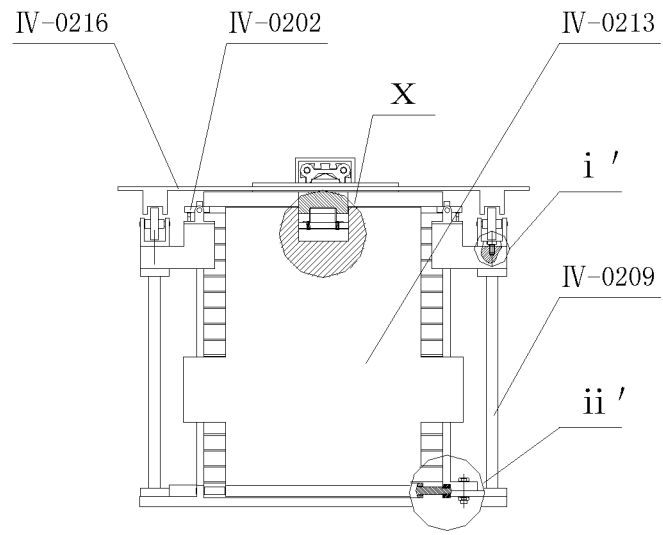
FIG. 25(a)
FIG. 25(b)  FIG. 25(c)  FIG. 25(d)
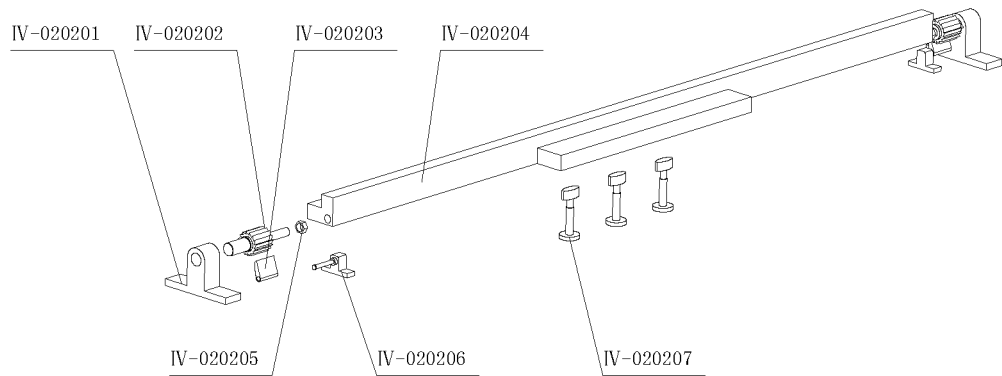
FIG. 26

View of stress on blade when I ≤ 0

View of stress on blade when I > 0

CARBIDE BLADE CUTTER HEAD FILLING DEVICE AND METHOD

BACKGROUND

Technical Field

The present disclosure relates to the field of alloy blade processing, in particular to a carbide blade cutter head filling device and method.

Related Art

The description in this section merely provides background information related to the present disclosure, and does not necessarily constitute the prior art.

To meet processing accuracy, a cutter of a machine tool should have high hardness, high wear resistance, sufficient strength and toughness, and high heat resistance. A carbide blade is made of cemented carbide. The cemented carbide is an alloy material which is made of hard compounds of refractory metals and bonding metals through a powder metallurgy process, and can meet the attribute requirements of the cutter in the machining process. The carbide blade is known as an 'industrial tooth'. China, as a major industrial manufacturing country in the world, has a great demand for carbide blades. The manufacturing process of the carbide blade mainly includes the technical processes of powder production, powder pressing, high-temperature sintering, blade grinding, blade passivation and coating. The grinding processing procedure of the carbide blade mainly adopts a diamond grinding wheel grinding processing method through a diamond grinding wheel, and the final production process of the carbide blade is completed through the grinding processes such as blade end surface grinding, polishing, periphery grinding, blade grooving, and cutting edge grinding, followed by subsequent passivation and coating. With the continuous development of the computer technology, the traditional manufacturing industry of China begins to gradually transform to an intelligent manufacturing mode. The traditional manual processing mode of the carbide blade production line is gradually replaced with the apparatus processing mode with high intelligent degree. Various processing links are organically connected through intelligent conveying logistics apparatus. Meanwhile various production apparatus systems are in communication connection, so that material supply and demand relations and processing state information are shared in real time, less workers are needed in the whole-flow processing course, and even unmanned operation of a local processing course is realized.

In an intelligent blade processing production line, an intelligent processing apparatus is provided with an industrial manipulator to achieve automatic feeding and discharging of blades, and the automatic processing course of the blades can be completed as long as a certain number of blades to be processed are placed at the input end of the processing apparatus. Generally, before the initial process link of blade processing, the blades are manually added into a cutter head, and a blade accommodating groove is designed and processed in the cutter head. A large amount of repeated work is needed in the manual loading process, and the labor burden of workers is greatly increased. In addition, the edges and the corners of the carbide blades are sharp, which is easy to scratch the hands of workers, causing safety risks to the operators, and the manual blade loading efficiency is unstable. The carbide blade is generally placed in the cutter head in two modes, i.e., horizontal placement and vertical placement. In the vertical placement mode, the blade is easy to grab in the feeding and discharging processes, but the follow-up utilization rate of the cutter head is low after the blade is loaded. The cutter head using the horizontal placement is usually provided with a rectangular cutter groove. Meanwhile, after the processing course of this work procedure is completed, the cutter head using the horizontal placement can be directly used as a feeding cutter head in the next processing link, so that the feeding and discharging requirements of most carbide blades can be met by using a few of trays with different sizes. Meanwhile, the blade is not prone to falling off in the transportation process of the cutter head.

The inventor found that the high feeding difficulty of the horizontally placed blade can be solved by improving the performance of a blade feeding mechanical gripper at present. For example, a carbide numerical control blade automatic feeding and discharging device and method in the prior art realize the feeding and discharging process of the horizontally placed blade through a gripper and a blade suction head. Meanwhile, blade grinding machine tools of part of advanced apparatuses are provided with blade grippers having machine vision for accurate grabbing in the blade feeding process. In an intelligent blade processing production line, horizontally placing the blade in tray is more suitable for the blade feeding and discharging and cutter head conveying in the processing course. In addition, an automatic carbide blade loading system and method integrated with a manipulator are further provided, which can realize loading of the pressed and sintered blades into the cutter head through the manipulator, and automatic blade loading. However, since only one blade is grabbed and loaded each time, the loading efficiency is low, and the cost is high.

SUMMARY

Aiming at the defects in the prior art, a device and method for loading a carbide blade into a cutter head are provided. A function of automatically feeding and loading the blade is realized and the scattered blades are loaded into the cutter head in batches instead of manually completing repeated work in a process of manually loading the blade into the cutter head. Therefore, the labor intensity of workers is reduced, the production efficiency is improved, and the blade production cost is reduced.

A first objective of the present disclosure is to provide a carbide blade cutter head filling device, and the following technical solution is used:

The carbide blade cutter head filling device includes a feeding unit, a storage unit, a loading unit and a discharging unit which are successively arranged. The output end of the feeding unit is matched with an input end of the storage unit through a guide mechanism. The output end of the storage unit faces a conveying tray of the loading unit. The conveying tray is provided with a plurality of groups of transition holes for accommodating blades. A receiving mechanism for accommodating the cutter heads is arranged below a falling pull plate of the discharging unit. The communication or isolation between a transition hole and the cutter head in the receiving mechanism is adjusted by changing the relative position of the falling pull plate and the transition hole.

Further, the feeding unit includes a feeding mechanism, a guide mechanism and a recycling mechanism which are matched with one another, the output end of the feeding mechanism is matched with a plurality of conveying tracks arranged in parallel. One end of the guide mechanism faces the tail end of the conveying track while the other end corresponds to the storage unit. An opening of a recycling groove of the recycling mechanism faces the position where the conveying track is matched with the guide mechanism for receiving and recycling the falling blade.

Further, the guide mechanism includes guide rods and limiting clamps. The ends, which are away from the storage unit, of the guide rods are matched with the output end of the feeding unit for receiving the blades and penetrating through central holes of the blades, e. Each guide rod is matched with at least two limiting clamps, and the limiting clamps are successively arranged along the guide rod at intervals. A temporary storage segment is formed between adjacent limiting clamps. The limiting clamps clamp or release the guide rod for blocking or releasing the blades, and at the same moment, at least one limiting clamp clamps the guide rod.

Further, the storage unit includes a storage device and a vibrator connected to the storage device. The storage device is provided with a plurality of passages matched with the guide mechanism. The cross-section shape of the passage is matched with that of the blade. One end of the passage is matched with the output end of the guide mechanism while the other end faces the conveying tray.

Further, the loading unit includes a carrier plate, the conveying tray slidably matched with the carrier plate and a guide mechanism matched with the carrier plate. The conveying tray is matched with a reciprocating driving mechanism, and a plurality of groups of transition holes are successively arranged in the moving direction of the conveying tray. The guide mechanism is mounted on the carrier plate, and two sides of the conveying tray are respectively matched with the guide mechanism.

Further, the carrier plate is provided with a plurality of grooves matched with the falling pull plate. The conveying tray is in sliding fit with the falling pull plate, and the conveying tray moves to change the matching state of the transition hole and the falling pull plate so that the transition hole moves to a position above the falling pull plate.

Further, the discharging unit includes the receiving mechanism for accommodating the cutter head, the falling pull plate matched above the receiving mechanism, and a pushing mechanism matched with the receiving mechanism. The receiving mechanism is provided with a jacking module. The output end of the jacking module carries a plurality of cutter heads which are stacked successively. The falling pull plate is matched with a telescopic module, to drive falling and change the matching state of the falling pull plate and the cutter head. The pushing mechanism is arranged on one side of the receiving mechanism for pushing the cutter head to be discharged from one side of the receiving mechanism.

Further, a discharging receiving plate is arranged on the side, which is away from the pushing mechanism, of the receiving mechanism. The discharging receiving plate is opposite to the receiving mechanism for receiving the cutter head discharged from the receiving mechanism.

A second objective of the present disclosure is to provide a carbide blade cutter head filling method. The method uses the carbide blade cutter head filling device and includes the following steps:

collecting, by the feeding unit, blades and gradually driving the blades for feeding, and conveying the blades to the position where the feeding unit is matched with the guide mechanism;

collecting, by the guide mechanism, the blades and conveying the blades to the storage unit for temporary storing;

releasing and discharging, by the storage unit, the blades into the transition holes, and switching the positions of the transition holes after the previous group of transition holes of the conveying tray are totally filled with the blades to fill a next group of transition holes with the blades;

moving one group of transition holes filled with the blades onto the falling pull plate, pulling out the falling pull plate, such that the transition holes are communicated with the cutter heads and the blades fall into the corresponding cutter heads, enabling the falling pull plate to reset so as to isolate the transition holes from the cutter heads, discharging, by a discharging unit, the cutter heads filled with the blades, and enabling the next cutter head to rise to a position below the falling pull plate; and moving the other group of transition holes filled with the blades onto the falling pull plate, and repeating the discharging and cutter head filling process.

Further, the guide mechanism conveys the cutter heads into the storage unit in batches, and the conveying tray moves in a reciprocating manner to switch and be matched with the transition holes.

Compared with the prior art, the present disclosure has the following advantages and positive effects:

(1) A function of automatically feeding and loading is fulfilled, and the scattered blades are loaded in the cutter heads in batches instead of manually completing the repeated work of blade loading, so that the labor force for blade loading in the processing course of a blade grinding link is reduced, less workers are needed in the processing course, the labor intensity of the workers is reduced, and the blade production cost is reduced while the production efficiency is improved.

(2) In a blade loading process, the principle of blade gravity falling is adopted. In a loading process, a guide rod guides the falling blade, and standardizes the falling movement track of the blades. The difficulty of the blades falling into cylindrical storage holes is reduced. Meanwhile, a blade recycling box is added, and the blades which thread through the guide rods are fed again, so that the working efficiency and stability of the device are improved.

(3) The blade transition holes in the blade carrier plate of a carbide blade loading machine are arranged in an array, and the arrangement mode of the blade transition holes is the same as that of blade grooves in the cutter head. Therefore, the blade loading for one cutter head can be completed in one working process, and the efficiency of blade loading is greatly improved.

(4) The carbide blade loading machine is high in universality to blades in different models, a conveying component in a blade conveying link is changed according to the size of a loaded blade shape circumscribed circle, and thus, different blades can be horizontally placed into the cutter heads.

(5) According to the carbide blade loading machine, hardware of independent units of various portions of apparatus is controlled through an intelligent chip, the working sequence of different components is controlled, communication connection between an intelligent chip control system and other apparatus system is established, and the function extension of the apparatus can be realized.

(6) Cutter head discharging units of the carbide blade loading machine are bilaterally symmetrical in distribution by taking a blade forming storage unit as an axis, and a continuous working process is realized by left-right linear reciprocating movement of the blade carrier plate, such that the continuous working process of the blade carrier plate is realized, the working rhythm is accelerated, and the loading efficiency is improved effectively.

BRIEF DESCRIPTION OF THE DRAWINGS

The accompanying drawings constituting a part of the present disclosure are used to provide further understanding of the present disclosure. Exemplary embodiments of the present disclosure and descriptions thereof are used to explain the present disclosure, and do not constitute an improper limitation to the present disclosure.

FIG. 25(a) is a front view of the cutter head pushing device according to Embodiment 1 and Embodiment 2 of the present disclosure;

FIG. 25(b) is a partial enlarged view of x in FIG. 25(a) according to Embodiment 1 and Embodiment 2 of the present disclosure;

FIG. 25(c) is a partial enlarged view of i' in FIG. 25(a) according to Embodiment 1 and Embodiment 2 of the present disclosure;

FIG. 25(d) is a partial enlarged view of ii' in FIG. 25(a) according to Embodiment 1 and Embodiment 2 of the present disclosure;

FIG. 26 is an exploded view of assembling components of a cutter head jacking and changing push rod according to Embodiment 1 and Embodiment 2 of the present disclosure;

Figure 1:
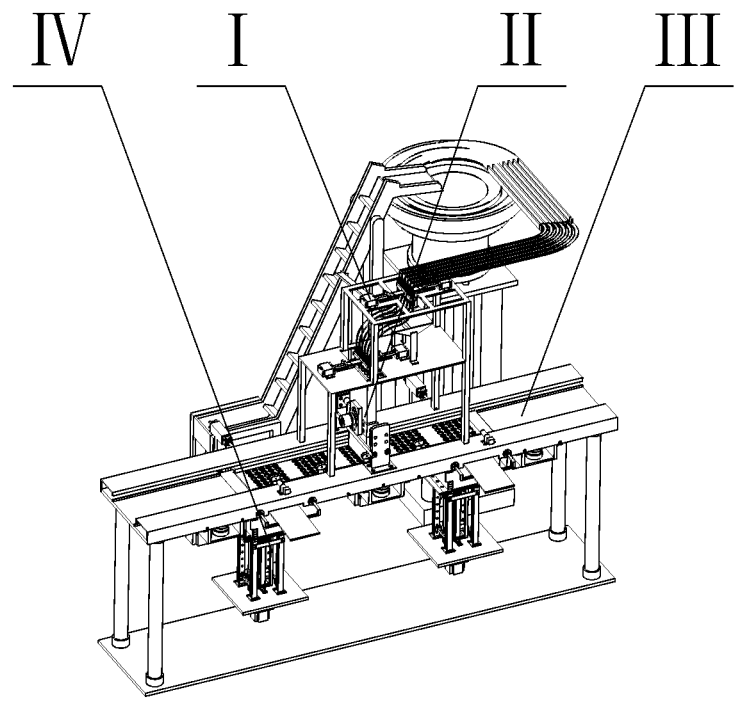
FIG. 1 is an axonometric view of a carbide blade cutter head filling apparatus according to Embodiment 1 and Embodiment 2 of the present disclosure.

In the drawings, I—blade spiral vibration feeding unit, II—blade forming storage unit, III—blade loading unit, and IV—cutter head discharging unit.

I-01—cutter head feeding conveying belt, I-02—blade spiral vibration feeding tray, and I-03—blade gravity falling guide device; and I-0201—conveying track, I-0301—blade gravity falling guide rod, I-0302—guide rod time-sharing fixing clamp, I-0303—clamp guide sliding block, I-0304—clamp guide sliding track, I-0305—air cylinder fixing clamp, I-0306—double-shaft air cylinder, I-0307—blade stacking height monitoring sensor, I-0308—sensor fixing clamp, I-0309—sensor fixing plate, I-0310—blade recycling box, and I-0311—guide device fixing rack.

I-031001—blade refeeding sliding groove, I-031002—blade recycling box hopper, and I-031003—blade recycling box fixing plate.

II-01—fixing side plate, II-02—fixing stand column, II-03—fixing connecting plate, II-04—blade anti-jamming vibrator, II-05—blade storage state observation plate, II-06—blade storage device, II-07—reinforced fixing connecting plate, II-08—blade conveying tray positioning sensor, II-09—cutter head discharging receiving plate, and II-10—sensor fixing base.

II-0601—vibrator fixing boss, and II-0602—blade storage hole.

III-01—blade conveying tray carrier plate, III-02—blade conveying tray positioner, III-03—blade conveying tray, III-04—gear fixing sleeve, III-05—gear, III-06—belt pulley shaft upper end bearing, III-07—transmission key, III-08—driven belt pulley, III-09—belt pulley shaft lower end bearing, III-10—belt pulley fixing seat, III-11—transmission belt, III-12—belt pulley driving motor, III-13—driving belt pulley, III-14—coupling, III-15—motor fixing sleeve, III-16—driving belt pulley bearing, III-17—bearing mounting seat, III-18—blade conveying tray bottom plate, and III-19—carrier plate fixing rod.

III-0101—blade conveying tray sliding guide track, III-0301—blade transition hole, III-0302—blade conveying tray positioner mounting hole, and III-0303—blade conveying tray transfer tooth.

IV-01—cutter head jacking device, and IV-02—cutter head pushing device.

IV-0101—sliding block connecting rod, IV-0102—lifting table fixing plate, IV-0103—cutter head jacking rack, IV-0104—cutter head jacking rack connector, IV-0105—lifting table, IV-0106—lead screw upper end bearing, IV-0107—lifting lead screw, IV-0108—lead screw nut connecting block, IV-0109—ball screw nut, IV-0110—lead screw far shaft end bearing, IV-0111—axial positioning ring, IV-0112—lifting motor coupling joint, IV-0113—lead screw near shaft end bearing, IV-0114—bearing mounting lantern ring, IV-0115—lifting lead screw driving motor, IV-0116—lifting lead screw driving motor fixing sleeve, IV-0117—lifting bottom plate, IV-0118—lead screw axial fixing plate, IV-0119—lifting table lifting guide track, IV-0120—guide track sliding block, IV-0121—guide track fixing rod side fixing plate, IV-0122—guide track fixing rod top fixing plate, and IV-0123—guide track fixing rod; IV-0201—filled cutter head, IV-0202—cutter head changing upward ejection rotating rod, IV-0203—cutter head discharging pushing device, IV-0204—falling pull plate connector, IV-0205—pull plate electric telescopic rod, IV-0206—telescopic rod fixing seat, IV-0207—guide pulley fixing plate, IV-0208—guide pulley, IV-0209—fixing plate supporting rod, IV-0210—cutter head feeding box, IV-0211—cutter head pushing device bottom plate, IV-0212—feeding plate rolling shaft, IV-0213—feeding plate, IV-0214—stopper resetting torsional spring, IV-0215—cutter head discharging sliding stopper, and IV-0216—falling pull plate.

IV-020201—ratchet wheel fixing seat, IV-020202—ratchet wheel, IV-020203—ratchet wheel rotating stopper, IV-020204—cutter head feeding rotating rod, IV-020205—ratchet wheel fixing nut, IV-020206—ratchet wheel rotating stopper seat, and IV-020207—feeding rotating rod supporting seat; IV-020801—roller, and IV-020802—roller fixing rod; and IV-021001—cutter head feeding box side plate, IV-021002—cutter head discharging push plate guide groove, IV-021003—feeding plate fixing buckle B, IV-021004—cutter head feeding box fixing bottom hole, IV-021005—feeding plate rolling shaft fixing boss, IV-021301—feeding plate rolling shaft mounting hole, IV-021302—feeding plate fixing buckle A, IV-021303—cutter head discharging sliding stopper mounting hole, and IV-021304—torsional spring mounting column.

DETAILED DESCRIPTION

It should be noted that the following detailed descriptions are all exemplary and are intended to provide a further description of the present disclosure. Unless otherwise specified, all technical and scientific terms used herein have the same meaning as commonly understood by a person of ordinary skill in the technical field to which the present disclosure belongs.

It should be noted that terms used herein are only for describing specific implementations and are not intended to limit exemplary implementations according to the present disclosure. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof;

For ease of description, words "up", "down", "left", and "right" appearing in the present disclosure only mean that they are consistent with the up, down, left, and right directions of the drawings themselves, and do not limit the structure. It is for the convenience of describing the present invention and simplifying the description, rather than indicating or implying that the device or element referred to must have a specific orientation, be constructed and operated in a specific orientation, and therefore cannot be understood as a limitation of the present disclosure.

As introduced in the related art, in the prior art, the pressed and sintered blades can be loaded into a cutter head through a manipulator, automatic loading of the blades can be realized. However, since only one blade is grabbed and loaded each time, the efficiency is low and the cost is high. In order to solve the problems, the present disclosure provides a carbide blade cutter head filling device and method.

Embodiment 1

In an exemplary embodiment of the present disclosure, as shown in FIG. 1 to FIG. 33(b), provided is a carbide blade cutter head filling device.

The carbide blade cutter head filling device as shown in FIG. 1 includes a blade spiral vibration feeding unit I, a blade forming storage unit II, a blade loading unit III and a cutter head discharging unit IV. Each portion independently completes a certain function in a process of blade loading. Through reasonable spatial position layout of each unit apparatus, connection of hardware of the apparatus of the various units is realized according to a work procedure, and finally, blades which are in a messy state are mounted into the cutter heads in batches through the combined action of various units under a control system. Each functional unit is provided with a feedback adjustment sensor for process control, acquires information in real time according to the sensor and feeds the information back into the control system. The hardware system of equipment is effectively controlled through an industrial computer software system to prevent poor working state and apparatus fault in a working process. An intelligent chip may be selected as a control component of an industrial control system, and the various feedback sensors are connected to an I/O port of the intelligent chip. Meanwhile, a chip control information output end is connected to hardware control interfaces of the blade spiral vibration feeding unit I, the blade forming storage unit II, the blade loading unit III, and the cutter head discharging unit IV, and the working state of each unit of the apparatus is effectively adjusted and controlled through an intelligent chip control system.

Figure 2:
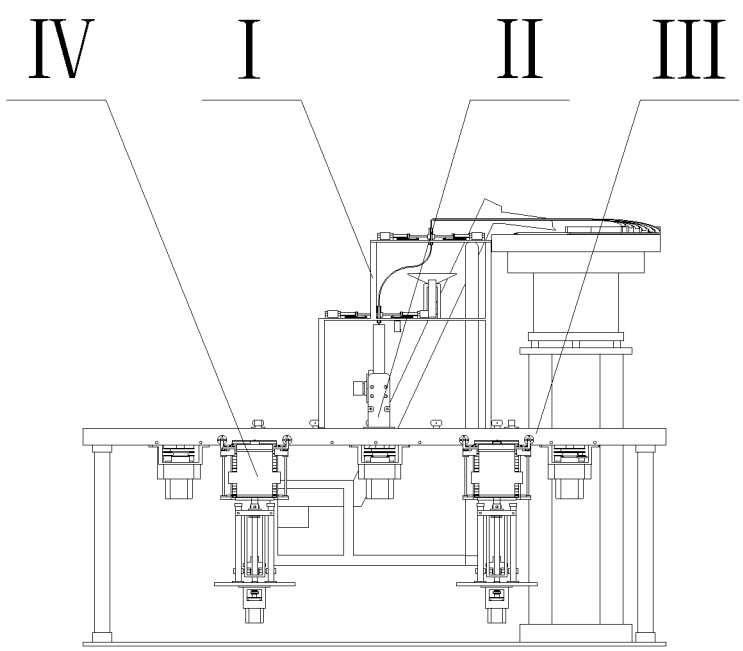
FIG. 2 is a front view of the carbide blade cutter head filling apparatus according to Embodiment 1 and Embodiment 2 of the present disclosure.

As shown in a front view of the carbide blade cutter head filling device in FIG. 2, the blade spiral vibration feeding unit I is located at the uppermost end of the apparatus, and the lower end of the blade spiral vibration feeding unit I is abutted against the blade forming storage unit II apparatus. A working plane of the upper portion of the blade loading unit III device clings to a blade discharging port of the blade forming storage unit II. The cutter head discharging unit IV is connected to the bottom plate of the blade loading unit III apparatus, and are bilaterally symmetrical, meeting left-right reciprocating loading requirements during blade loading, and facilitating the working efficiency of the carbide blade cutter head filling device.

Figure 3:
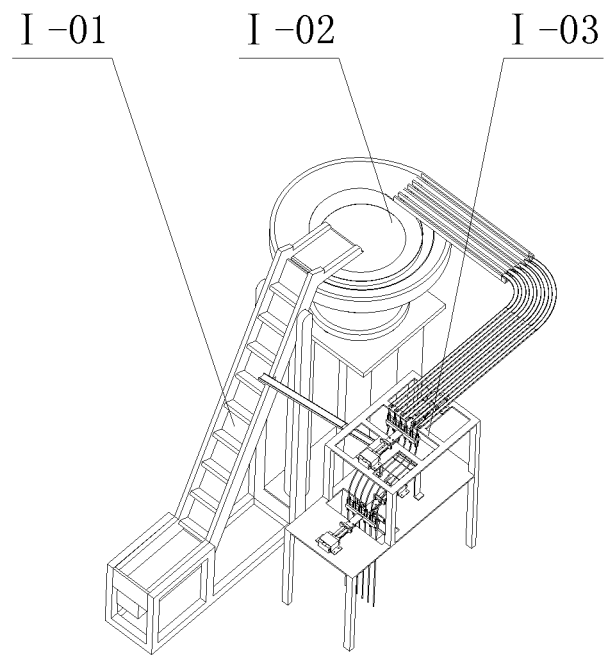
FIG. 3 is an axonometric view of a blade spiral vibration feeding unit according to Embodiment 1 and Embodiment 2 of the present disclosure.
Figure 4:
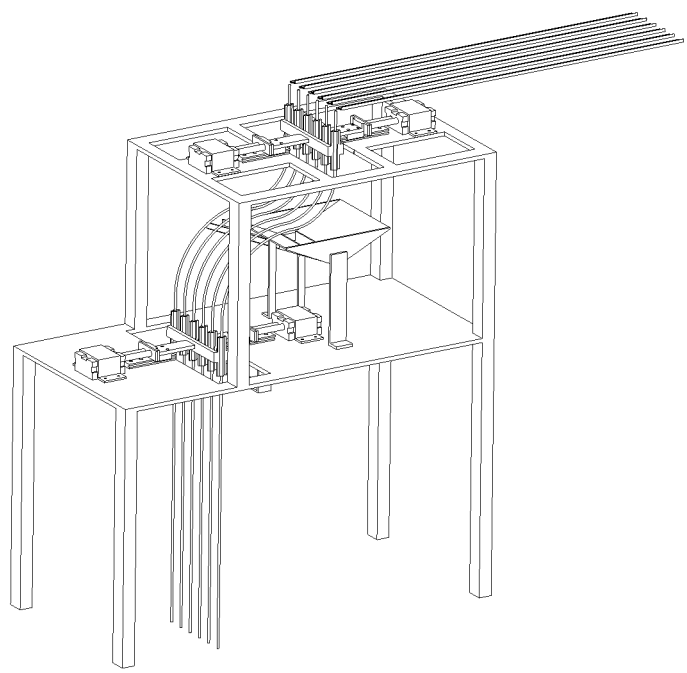
FIG. 4 is an axonometric view of a blade gravity falling guide device according to Embodiment 1 and Embodiment 2 of the present disclosure.

As shown in FIG. 3 to FIG. 4, the blade spiral vibration feeding unit includes a cutter head feeding conveying belt I-01, a blade spiral vibration feeding tray I-02 and a blade gravity falling guide device I-03. The cutter head feeding conveying belt I-01 adopts a slope conveying belt to convey the blades into the blade spiral vibration feeding tray I-02 from a feeding box.

A blade vibration tray uses a multi-track spiral vibration feeding tray which makes the blades which are scattered and disordered be conveyed through tracks according to a certain pose.

The specific implementation is that the carbide blades are conveyed from a hopper along spiral tracks under the vibration action of a vibration tray driving source, and enter conveying tracks I-0201 for being conveyed along the tracks according to an arrangement element defined pose through a directional arrangement element. A remover is arranged at the lower end of the directional arrangement element. The remover uses a visual monitoring and air blowing device to identify the front and back surfaces of the blades, and blows the blades with the back surfaces up out of the tracks through the air blowing device. Therefore, it is ensured that the blades conveyed to discharge ports of the tracks are all the blades with the front surfaces up. When it is unnecessary to distinguish the front and back surfaces of the loaded blades, the remover in the multi-track spiral vibration feeding tray does not work.

Figure 5A:
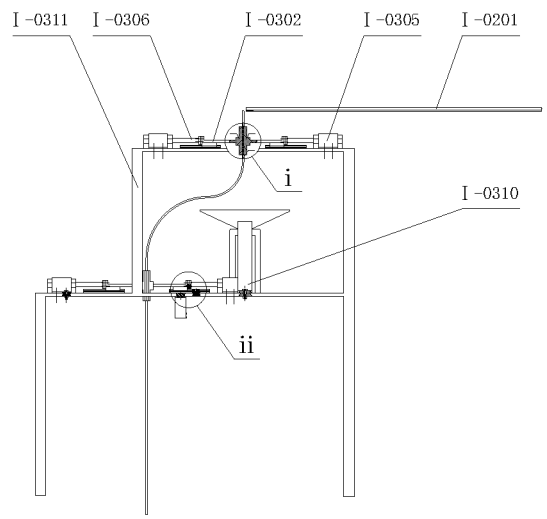
FIG. 5(a) is a front view of the blade gravity falling guide device according to Embodiment 1 and Embodiment 2 of the present disclosure.

A blade gravity falling guide rod I-0301 is arranged at the tail end of the track of the multi-track spiral vibration feeding tray, as shown in FIG. 5(a). Suitable vibration tray parameters are selected, the blades are further controlled to be conveyed in the tracks at a moderate speed, such that when the blades slip from the ports of the conveying tracks, guide rods penetrate through inscribed circular holes of the carbide blades. The guide rods can easily penetrate through the inscribed circular holes of the blades due to the spherical design of the top ends of the guide rods.

Primary shaping work of the scattered blades can be realized through the blade spiral vibration feeding unit. The blade spiral vibration feeding unit is located at the initial end of the loading machine apparatus, and is a basic working link of work of the loading machine apparatus. Through the slope conveying belt, the blades are conveyed into the multi-track spiral vibration feeding tray, and conveyed to the tail ends of the tracks according to a fixed pose mode through the vibration tray, and then the blades thread through the guide rods.

The guide rod is a bent rod, and the blade can be buffered at a bent portion, such that collision damage of the adjacent blades in a rapid sliding state is avoided. In the present embodiment, the guide rod is of an S-like rod structure.

Figure 7:
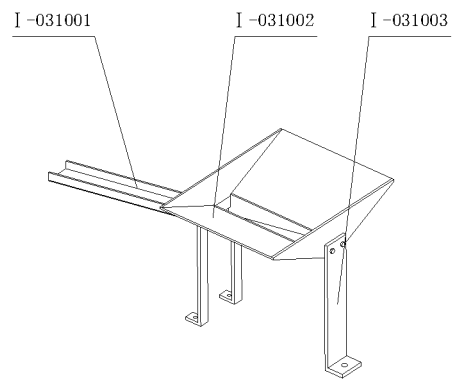
FIG. 7 is an axonometric view of a blade recycling box according to Embodiment 1 and Embodiment 2 of the present disclosure.

In a working process of vibration of the vibration tray, irregular vibration may occur accidentally, such that a small number of blades which cannot thread through the guide rods will fall into a blade recycling box I-0310 as shown in FIG. 7, and are returned to the cutter head feeding conveying belt I-01 through a blade refeeding sliding groove I-031001 for refeeding and loading.

The spiral vibration feeding tray selects parameters to enable the blades to be continuously conveyed in the track. The view of stress analysis of the blades in a spiral inclined track is as shown in FIG. 33. The stress of the blades on the track includes gravity, track counterforce, frictional force, and inertia force. The frictional force and the inertia force are related to current of an electromagnet of the vibration tray.

Figure 33A:
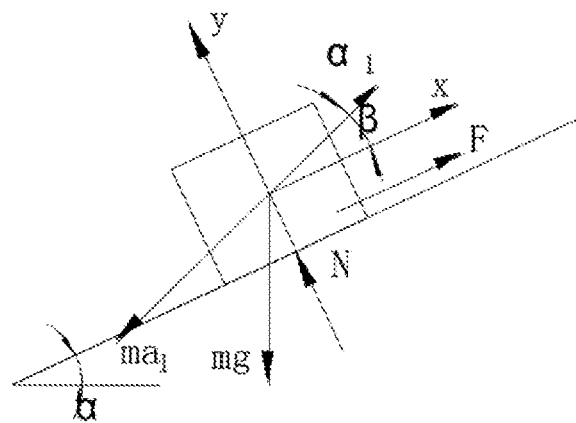
FIG. 33(a) is a schematic diagram of stress analysis of the blades in a spiral inclined track according to Embodiment 1 and Embodiment 2 of the present disclosure.

(1) when I=0, a supporting spring resets, the track moves to up right at accelerated speed $a_1$, and the stress on workpieces is balanced, as shown in FIG. 33(a):

$$ma_1 \cos \beta + mg \sin \alpha = F = \mu N$$

$$ma_1 \sin \beta + mg \cos \alpha = N$$

Figure 33B:
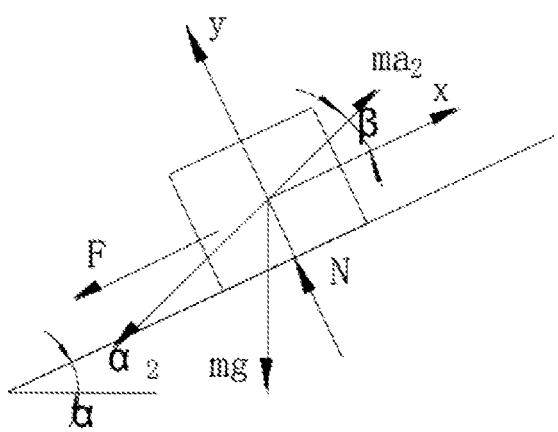
FIG. 33(b) is a schematic diagram of stress analysis of the blades in the spiral inclined track according to Embodiment 1 and Embodiment 2 of the present disclosure.

(2) when I>0, the electromagnet attracts, and the track moves to lower left at accelerated speed $a_1$, and the stress on workpieces is balanced, as shown in FIG. 33(b):

$$ma_2 \cos \beta - mg \sin \alpha = F = \mu N$$

$$ma_2 \sin \beta - mg \cos \alpha = -N$$

when the blades move upwards along the track, at the moment, it can be obtained the following according to whether the electromagnet attracts or not:

$$I=0 a_1 \leq g(\sin \alpha - \mu \cos \alpha)/(\mu sir\beta - \cos \beta)$$

$$I>0 a_2 \geq g(\sin \alpha + \mu \cos \alpha)/(\mu sir\beta + \cos \beta).$$

To achieve a predetermined feeding of an electromagnetic vibratory feeder, the accelerated speed a1 of the track moving to upper right and the accelerated speed a2 of the track moving to lower left must satisfy the above conditional expression when the workpieces move upward along the track. The motion states of the workpieces moving upwards along the track vary with a variety of conditions.

The blades of the device are continuously conveyed and need to meet the following conditions: continuous sliding motion process:

(1) I=0, a hopper is reset by a spring, and the workpieces move upwards from a point A to a point B depending on friction and spatial position;

(2) I>0, the electromagnet attracts, and due to inertia, the workpieces slide from the point B along the track (the sliding time≥the time for conveying the hopper to the lowest portion);

(3) I=0, the workpieces have slipped to a point C when stopped.

In such reciprocation, the workpieces move upwards along the track, slide and then move upwards along the track.

By the feeding mode, the feeding speed and feeding rate of the workpieces are high, and the workpieces move stably, facilitating orientation. The feeding mode is suitable for workpieces with regular shape and orientation requirements and feeding speed. Through the analysis, it is known that the assembling operation condition includes that the attraction force of the electromagnet, the amplitude of a material groove and the projecting angle are smaller than those of the electromagnet during jumping.

As shown in FIG. 5(a), two same clamps corresponding to two guide rod time-sharing fixing clamps I-0302 are mounted near the positions, connected to the blade storage devices of the upper end and the lower end of the blade gravity falling guide rod I-0301 to fix the guide rods. The two guide rods work in a time-sharing fixing mode. Specifically, when the device is in a non-working state, the two clamps are in a clamping working state for the guide rods.

After the working mode of the device is started, the blades are fed from the multi-track vibration feeding tray and conveyed to the ports of the tracks. That is, when the working state is blade threading through rod, the clamp for the guide rod at the upper end is released, the clamp at the lower end fixes the guide rod, after the set time is up, the clamp at the upper end tightly clamps the guide rod again, the vibration tray stops conveying of the blades, and the clamp at the lower end releases the guide rod, such that the blades accumulated at the clamp at the lower end in the stage of blade threading through rod lose the stopping action of the clamp at the lower end and slip into blade storage holes of the blade storage device. After the falling of the blades is completed, the clamp at the lower end clamps the guide rod again, the clamp at the upper end releases the guide rod, and the blade vibration tray vibrates again for the action of blade threading through rod.

Figure 5B:
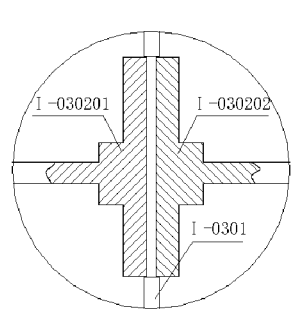
FIG. 5(b) is a partial enlarged view of i in FIG. 5(a) according to Embodiment 1 and Embodiment 2 of the present disclosure.
Figure 5C:
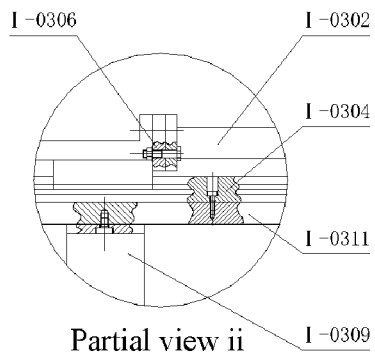
FIG. 5(c) is a partial enlarged view of ii in FIG. 5(a) according to Embodiment 1 and Embodiment 2 of the present disclosure.
Figure 6:
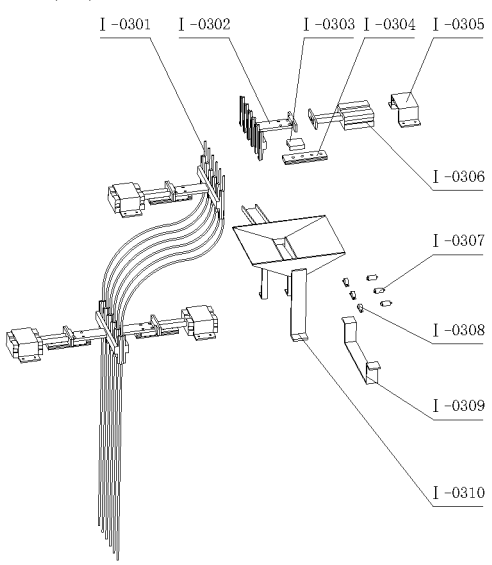
FIG. 6 is an exploded view of assembling components of the blade gravity falling guide device according to Embodiment 1 and Embodiment 2 of the present disclosure.

As shown in FIG. 6, the clamping and releasing of the guide rod time-sharing fixing clamp I-0302 is realized through contraction and stretching actions of a double-shaft air cylinder I-0306 connected thereto. The shaft end of the double-shaft air cylinder I-0306 is a flat plate and is fixedly connected to the guide rod time-sharing fixing clamp I-0302 through a bolt. The bottom of the guide rod time-sharing fixing clamp is connected to a clamp guide sliding block I-0303 through an inner hexagon screw, and the motion stability of the guide rod clamp in the clamping working process is ensured through the actions of clamp guide sliding block I-0303 and a clamp guide sliding track I-0304. The clamp guide sliding track I-0304 is fixed to the bottom plate of a guide device fixing rack I-0311 through an inner hexagon screw, and the connection relation is as shown in FIG. 5(c). The blade gravity falling guide rod I-0301 is provided with a rectangular groove at a clamp fixing position, so that the guide rods can be prevented from rotating circumferentially and sliding in the vertical direction during the clamping of the clamps, as shown in FIG. 5(b).

The upper end of the blade guide rod is close to a discharge port in the tail end of the blade conveying track, and the lower end of the blade guide rod reaches the tail end of a blade forming storage channel and is close to the blade carrier plate without interfering the plane motion of the blade carrier plate. The blade guide rod adopts a time-sharing staggered fixing mode, so that the blades threading through the guide rod can successfully fall into the blade storage holes of the blade forming storage unit.

A sensor fixing plate I-0309 is fixed to the bottom plate of the guide device fixing rack I-0311 through screws. A blade stacking height monitoring sensor I-0307 is fixed to a sensor fixing plate I-0309 through a sensor fixing clamp I-0308. The blade storage condition in the blade storage device II-06 is monitored through a blade storage state observation plate II-05, and is fed back to a control system in real time. When the storage device is fully filled with the blades, the control system stops a blade feeding process of the vibration tray in time.

Figure 8:
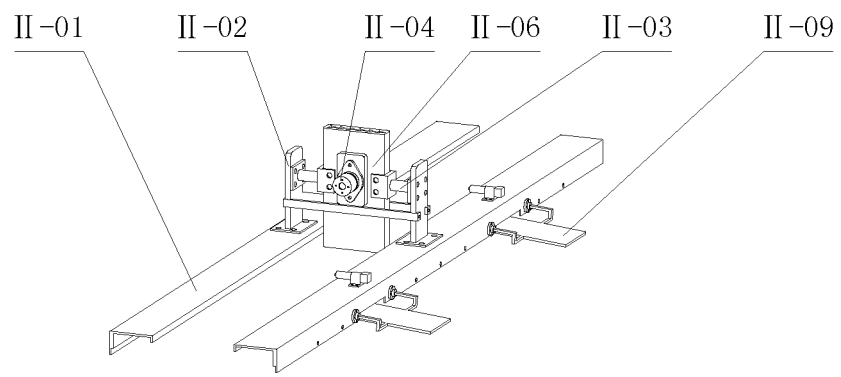
FIG. 8 is an axonometric view of blade forming storage unit apparatus according to Embodiment 1 and Embodiment 2 of the present disclosure.
Figure 9:
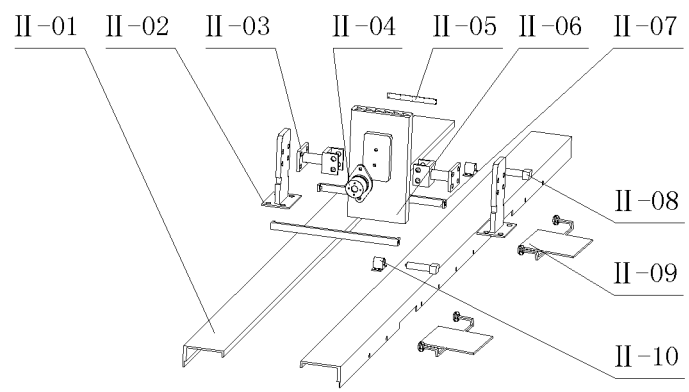
FIG. 9 is an exploded view of assembling components of the blade forming storage unit apparatus according to Embodiment 1 and Embodiment 2 of the present disclosure.
Figure 10:
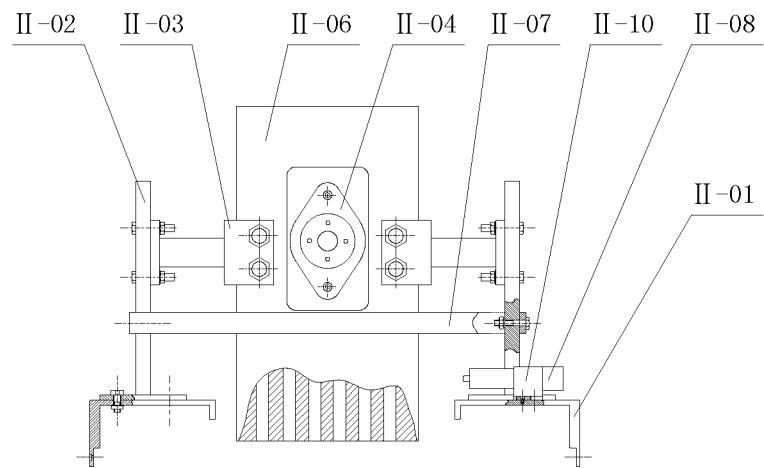
FIG. 10 is a left view of the blade forming storage unit apparatus according to Embodiment 1 and Embodiment 2 of the present disclosure.
Figure 11:
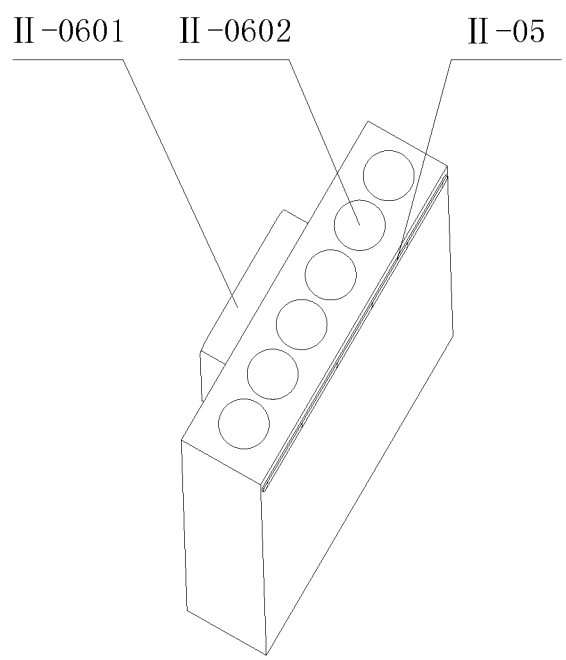
FIG. 11 is an axonometric view of a blade storage device according to Embodiment 1 and Embodiment 2 of the present disclosure.

The main working component of the blade forming storage unit II is the blade storage device II-06, and an axonometric view is shown as FIG. 11. A vibrator fixing boss II-0601 is designed on a side wall, and is connected to a blade anti-jamming vibrator II-04 through screws. After the blade vibration falling unit completes the blade falling each time, the blade anti-jamming vibrator is started to work once, and it is ensured that the blades which just enter the blade storage device are in a horizontally laid state in the storage holes. The blade storage device II-06 is in threaded connection to a fixing side plate II-01 through a fixing stand column II-02, a fixing connecting plate II-03 and a reinforced fixing connecting plate II-07, and the connection relation is as shown in FIG. 8, FIG. 9 and FIG. 10.

The two ends of the blade storage device in the blade forming storage unit are open, the horizontal plane on the blade conveying tray which clings to the lower end of the blade storage device closes the lower port, and the blades in the blade storage device are controlled, thus being loaded into the blade transition holes in the blade conveying tray through linear movement process of the blade conveying tray. Meanwhile, a visible plate is mounted at the upper end of the blade storage device, and whether the blade storage device is approximately fully filled with the blades is monitored through the sensor, so as to control the previous unit apparatus to pause blade conveying in real time.

Figure 17:
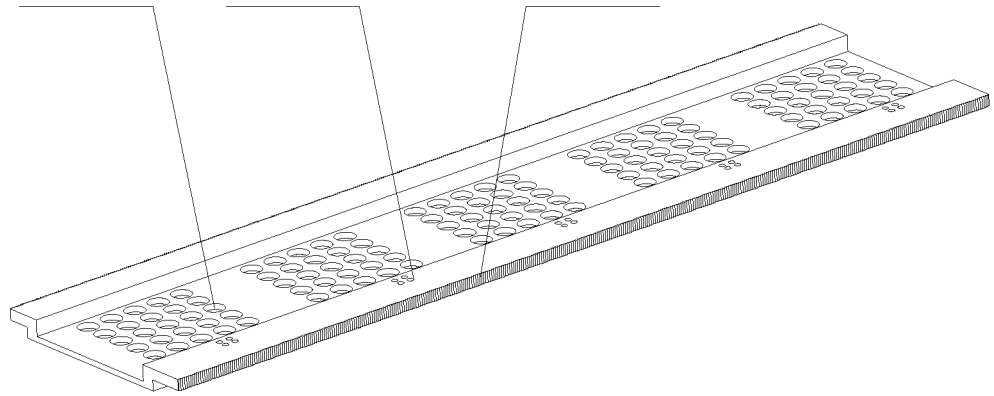
FIG. 17 is an axonometric view of a blade conveying tray according to Embodiment 1 and Embodiment 2 of the present disclosure.
Figure 18:
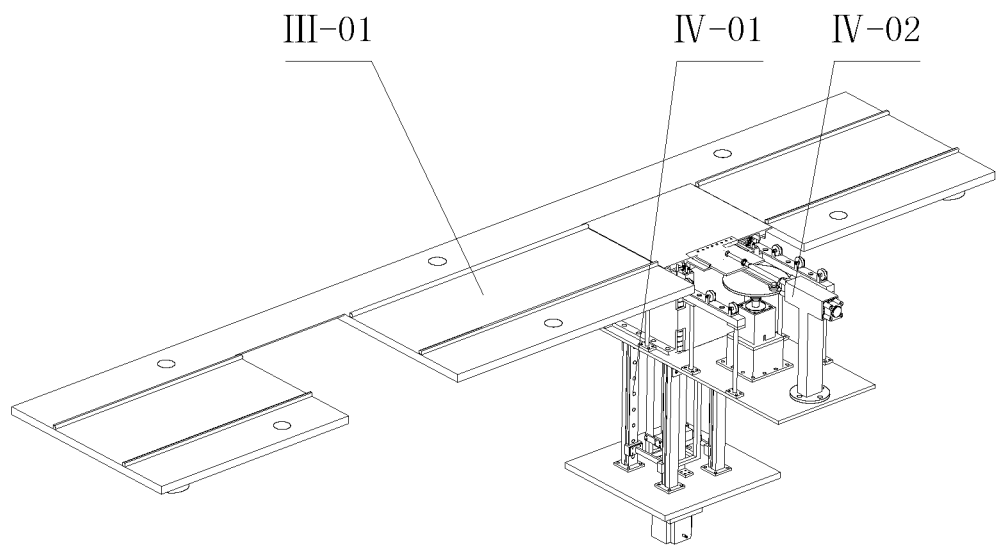
FIG. 18 is a positional relation view of a blade loading unit and a cutter head discharging unit according to Embodiment 1 and Embodiment 2 of the present disclosure.

The blade loading unit III mainly completes the arrangement of the blades in a storage tank of the blade forming storage unit II into the blade conveying tray III-03. The blade conveying tray III-03 is as shown in FIG. 17, a circular blade transition hole III-0301 having a diameter slightly greater than that of a blade shape circumscribed circle is designed, a rack structure which is matched with parameters of a gear III-05 is designed and processed at the edge of a plane, and a blade conveying tray positioner mounting hole III-0302 is processed in a side plate on one side of the plane for mounting a blade conveying tray positioner III-02.

Figure 15:
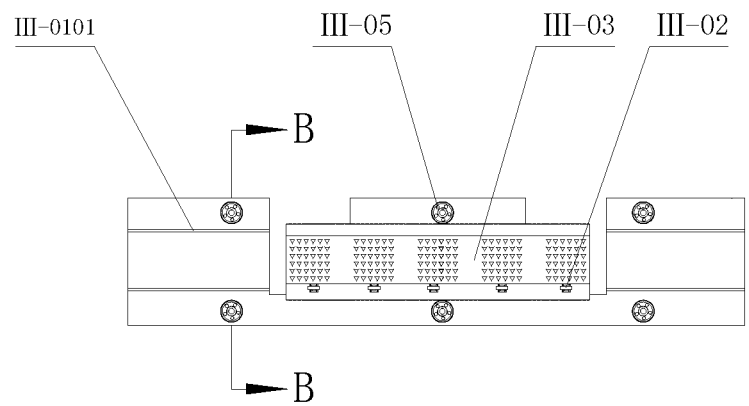
FIG. 15 is a top view of the blade loading unit apparatus according to Embodiment 1 and Embodiment 2 of the present disclosure.

In FIG. 15, the blade conveying tray III-03 linearly moves in a reciprocating manner along the X-axis direction under the action of a blade conveying tray sliding guide track III-0101 on the blade conveying tray carrier plate III-01, and the motion is implemented by rotational driving effect of the gear III-05 and a blade conveying tray transfer tooth III-0303 on the side of the blade conveying tray III-03 which is in contact with the gear.

The speed of the linear movement process of the blade conveying tray in the blade loading unit is controllable. When the upper surface without the blade transition holes passes through the blade storage device, the moving speed of the blade conveying tray is high, and when the blade transition holes pass through the blade storage device, the speed is relatively low.

Figure 12:
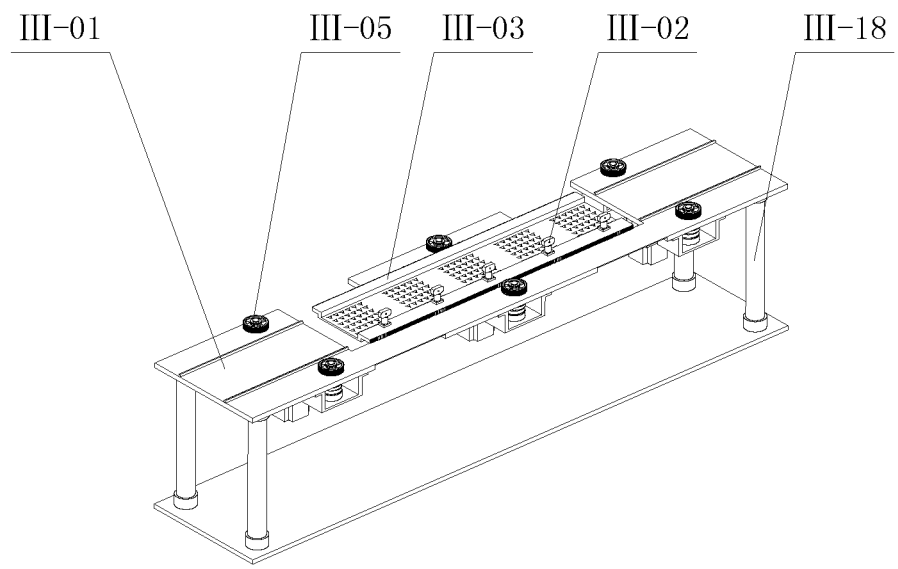
FIG. 12 is an axonometric view of a blade loading unit apparatus according to Embodiment 1 and Embodiment 2 of the present disclosure.
Figure 13:
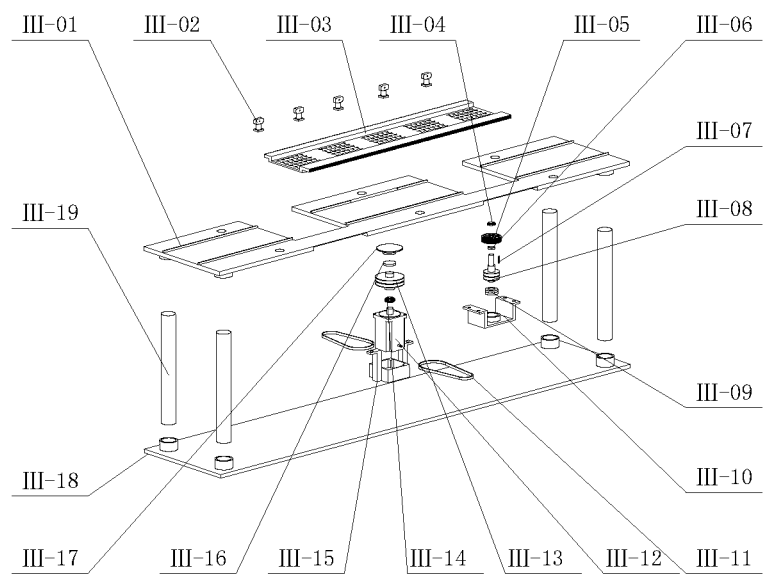
FIG. 13 is an exploded view of assembling components of the blade loading unit apparatus according to Embodiment 1 and Embodiment 2 of the present disclosure.

As shown in FIG. 12 and FIG. 13, bevel gears bilaterally symmetrical are designed at the front, middle and rear positions of the blade conveying tray carrier plate III-01 to ensure that there is always one driving gear to provide driving force for the blade conveying tray III-03 in a moving process, and there is always one set of power sources in the three pairs of gear sets at the front, middle and rear positions to participate in the conveying process of the blade conveying tray III-03. That is, when the blade conveying tray is located at the front end working position, the gear set at the front end and a driving assembly of the gear set work, as the position changes, the control system switches the working driving gear to the gear sets in the middle and rear sections for working. The specific replacement time point is determined and controlled after the position information of the blade conveying tray monitored by the blade conveying tray positioning sensor II-08 is transmitted to the control system.

Figure 14:
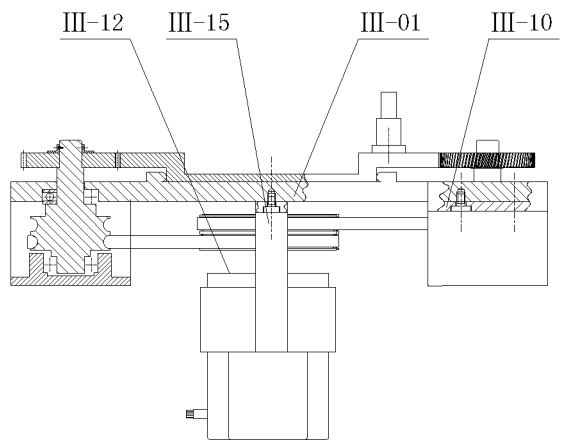
FIG. 14 is a left view of the blade loading unit apparatus according to Embodiment 1 and Embodiment 2 of the present disclosure.

In the driving gear set, the bevel gears are adopted as transmission gears, and fixed circumferentially on a driven belt pulley III-08 through a transmission key III-07. At the upper ends, the bevel gears are fixedly connected to a belt pulley rotating driving shaft through a gear fixing sleeve III-04, and thus the axial fixing effect of the bevel gears is also ensured. A belt pulley shaft upper end bearing III-06 and a belt pulley shaft lower end bearing III-09 are mounted at shaft shoulders at the upper end and the lower end of the belt pulley rotating driving shaft and are thrust bearings. The other ends of the bearings are mounted on a belt pulley fixing seat III-10, the belt pulley fixing seat is connected to the blade conveying tray carrier plate III-01 through screws, and the specific component assembling relation is as shown in FIG. 14.

The driven belt pulley III-08 is in belt connection with a driving belt pulley III-13 through a transmission belt III-11, a belt pulley driving motor III-12 drives the driving belt pulley to rotate, through the belt transmission effect, the driven belt pulley is driven to rotate, and then the bevel gear which is fixedly connected to a belt pulley rotating shaft is driven to rotate, and then the blade conveying tray III-03 is driven to move linearly.

Figure 16A:
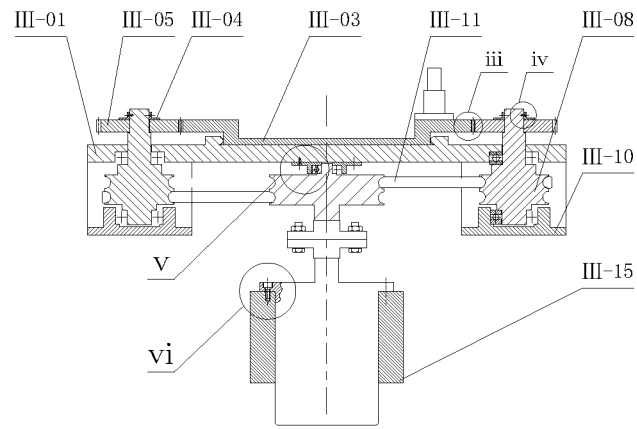
FIG. 16(a) is a cross-sectional view along B-B in FIG. 15 according to Embodiment 1 and Embodiment 2 of the present disclosure.
Figures 16B, 16C, 16D, 16E:
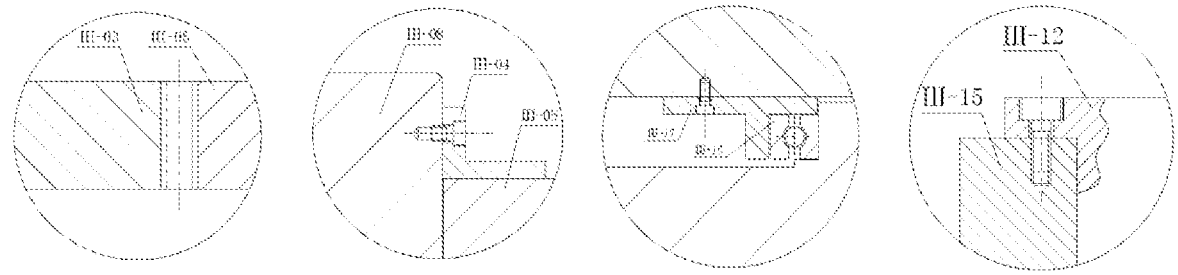
FIG. 16(b) is a partial enlarged view of iii in FIG. 16(a) according to Embodiment 1 and Embodiment 2 of the present disclosure.
FIG. 16(c) is a partial enlarged view of iv in FIG. 16(a) according to Embodiment 1 and Embodiment 2 of the present disclosure.
FIG. 16(d) is a partial enlarged view of v in FIG. 16(a) according to Embodiment 1 and Embodiment 2 of the present disclosure.
FIG. 16(e) is a partial enlarged view of vi in FIG. 16(a) according to Embodiment 1 and Embodiment 2 of the present disclosure.

The driving belt pulley and a rotating shaft thereof are designed integrally. A driving belt pulley bearing III-16 is mounted at the shaft shoulder at the upper end, and is a deep groove ball bearing. The outer ring of the upper end of the bearing is abutted against the boss of a bearing mounting seat III-17. The bearing mounting seat is fixed to the carrier plate through inner hexagon screws, as shown in FIG. 16(*d*), the lower end of the driving pulley rotating shaft is connected to the belt pulley driving motor III-12 through a coupling III-14, the motor is fixed to a motor fixing sleeve III-15 through flanged hole screws, and as shown in FIG. 16(*a*), the motor fixing sleeve is fixed to the carrier plate. As shown in FIG. 16(*a*), the driving belt pulley is connected to two belts, and drives the driven belt pulleys on two sides to rotate at the same time, By the arrangement mode, it can be ensured that the transmission forces of a pair of gears of the gear set is consistent, and the transmission stability is good. Meanwhile, under the arrangement mode, the two belts can rotate in the same direction, thereby meeting the conveying requirement.

Figure 19:
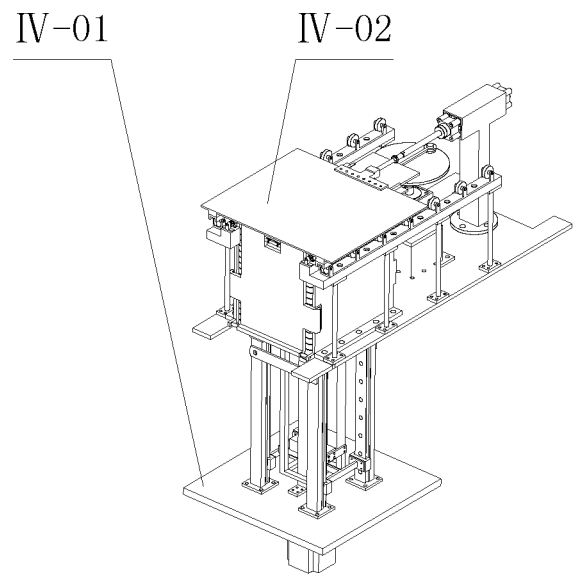
FIG. 19 is an axonometric view of the cutter head discharging unit according to Embodiment 1 and Embodiment 2 of the present disclosure.
Figure 30:
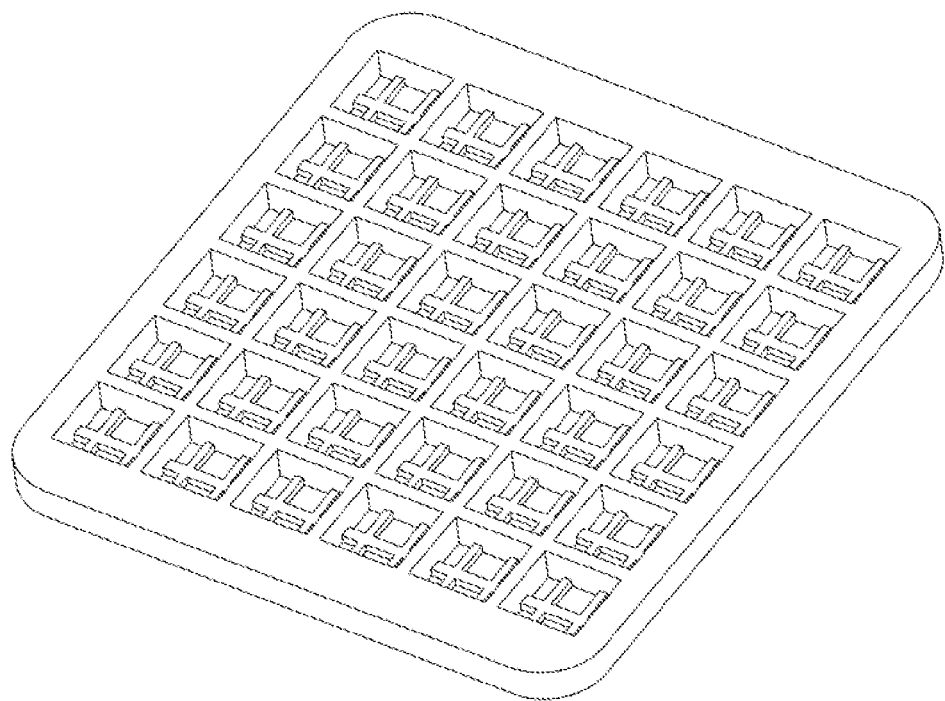
FIG. 30 is an axonometric view of cutter heads filled with blades according to Embodiment 1 and Embodiment 2 of the present disclosure.

As shown in FIG. 12 and FIG. 19, in the linear movement process of the blade conveying tray III-03, there is always a certain gap between the upper surface of the blade conveying tray III-03 and the lower end surface of the blade storage device II-06 in the height direction. The height of the gap is far smaller than the thickness of a blade. When the center line of a row of blade transition holes III-0301 in the Y-axis direction moves to be superposed to the center line of the blade storage holes II-0602 in the blade storage device II-06, the blades will be loaded into the row of blade transition holes III-0301 under the gravity and the frictional force of the side wall of a falling hole and the periphery restraining effect of blade holes. Along with the linear movement process, the blade transition holes are fully filled with the blades, after the blade transition holes fully filled with the blades reach the specified falling position of the cutter head discharging unit IV in the linear movement process of the blade conveying tray III-03, the carrier plate stops moving, and the falling pull plate IV-0216 in a cutter head pushing device IV-02 is pulled out and separated from the blade conveying tray carrier plate III-01. The blades in the blade transition holes III-0301 lose supporting of the upper surface of the pull plate, and fall from the circular blade transition holes into empty cutter head rectangular blade grooves nearby at the lower end. The size of the shortest side of the rectangular blade groove is greater than the diameter of the circular blade transition hole. Therefore, in the falling process, since the pull plate is quite thin and the pulling speed of the pull plate is high, the blades will accurately fall into the rectangular blade grooves in the cutter heads under the action of inertial force. The axonometric view of the cutter head is as shown in FIG. 30.

Figure 31:
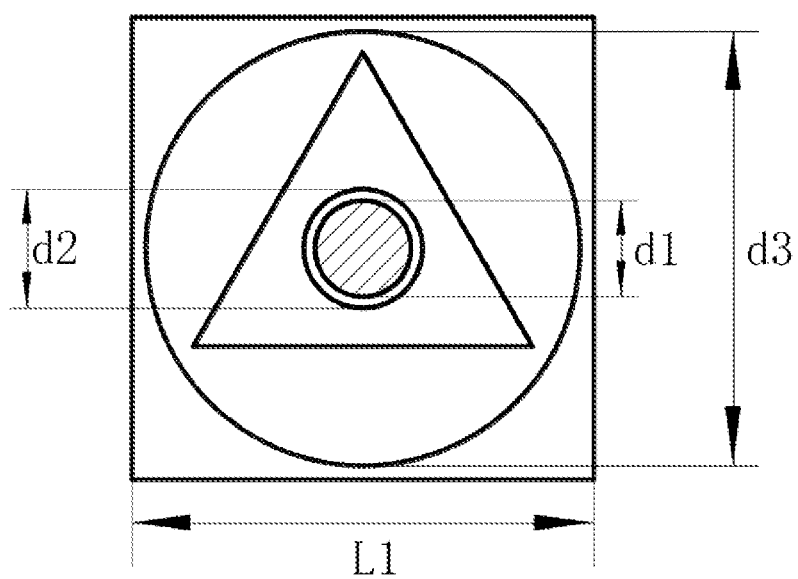
FIG. 31 is a schematic diagram of matching of transition holes and blades according to Embodiment 1 and Embodiment 2 of the present disclosure.

Taking a triangular blade with an inscribed circular hole as an example, a size relation view of various transition holes and final rectangular grooves of the cutter heads in the gravity falling process is as shown in FIG. 31, $d_1$ is the diameter of the blade guide rod, $d_2$ is the diameter of the inscribed circular hole of the blade, $d_3$ is the diameter of the blade circular transition hole, and $L_1$ is the length of the shortest side of the rectangular blade groove of the cutter head.

Whether the blade conveying tray III-03 reaches a falling position or not is monitored by a sensor. A blade conveying tray positioner III-02 is mounted on a side plate of the blade conveying tray at an axis position of each group of blade transition holes. When the blade conveying tray positioning sensor II-08 and the blade conveying tray positioner III-02 are located at the same axis position, the blade conveying tray III-03 stops moving, and related devices of the cutter head discharging unit IV start to work, so as to complete the blade loading.

The cutter head discharging unit IV is mainly composed of a cutter head jacking device IV-01 and a cutter head pushing device IV-02. After loading the blades into the cutter heads, a filled cutter head pushing device IV-02 pushes the fully filled cutter heads out from a blade loading station, and the cutter head jacking device IV-01 jacks and pushes empty cutter heads in the storage tank to the blade loading station for next supply and filling.

Figure 20:
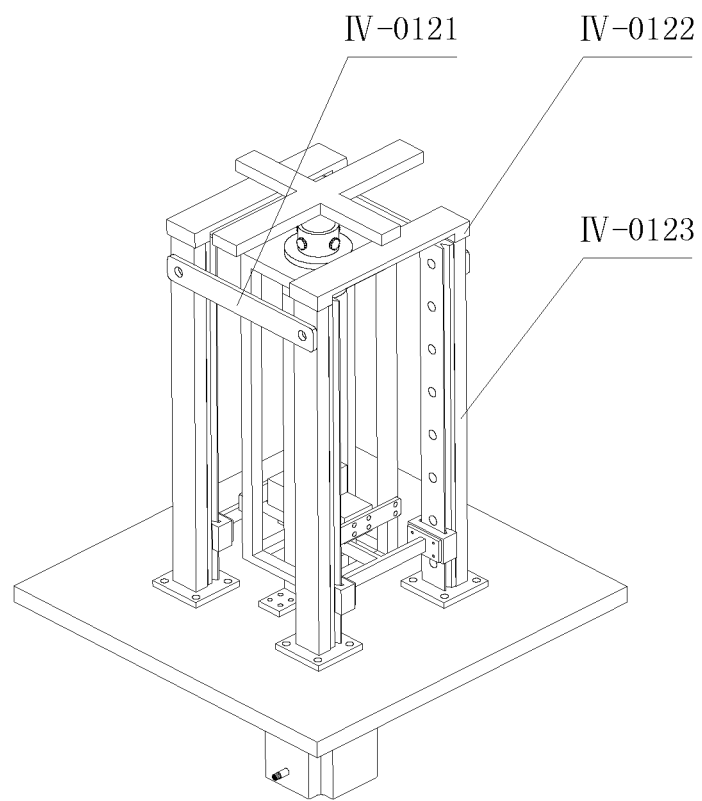
FIG. 20 is an axonometric view of a cutter head jacking device according to Embodiment 1 and Embodiment 2 of the present disclosure.
Figure 21:
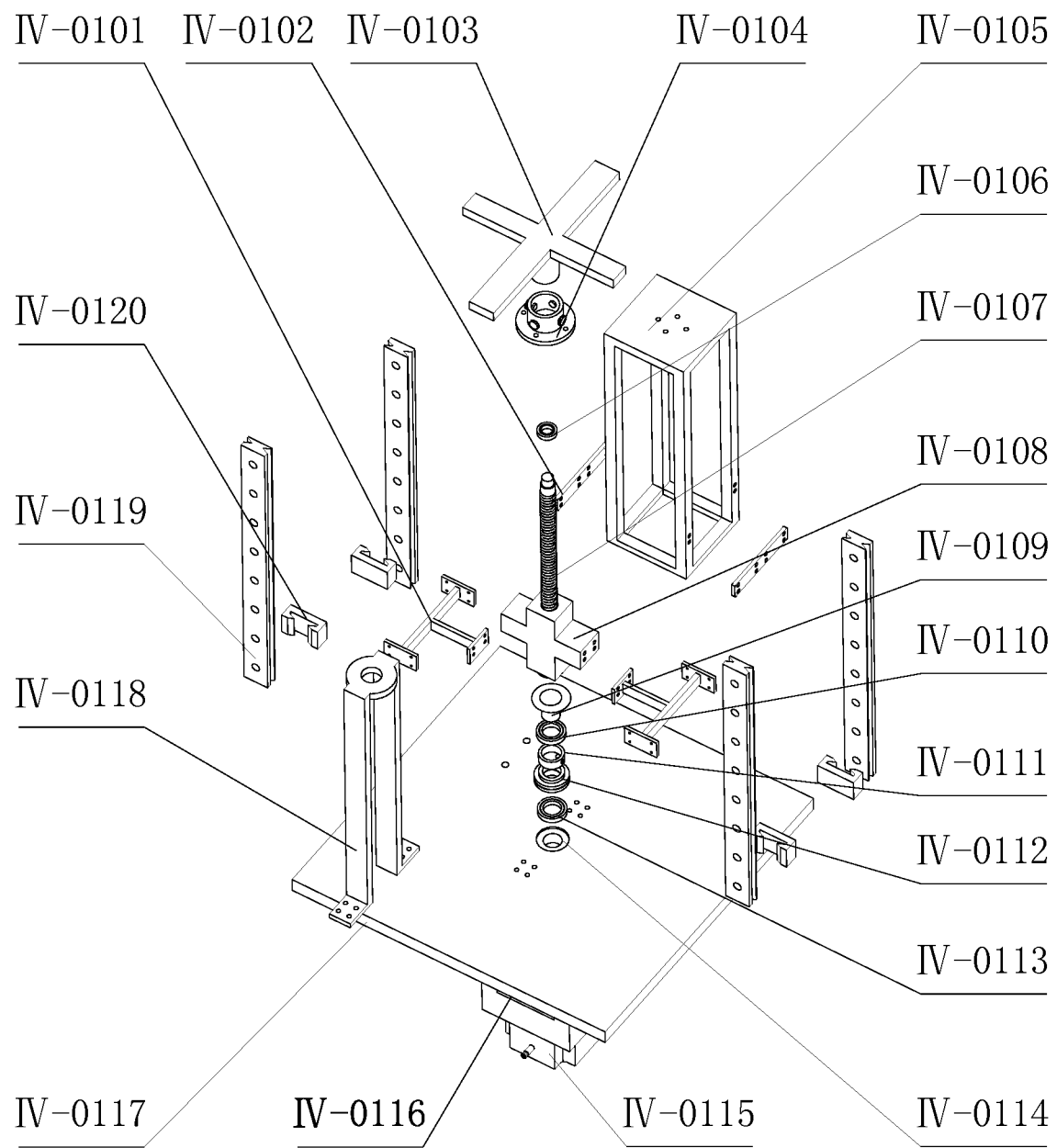
FIG. 21 is an exploded view of assembling components of the cutter head jacking device according to Embodiment 1 and Embodiment 2 of the present disclosure.
Figure 22A:
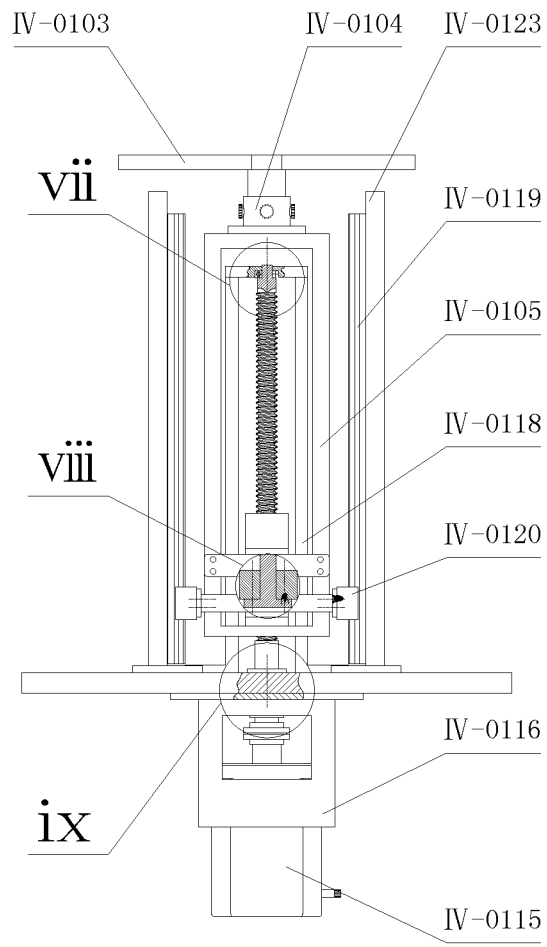
FIG. 22(a) is a front view of the cutter head jacking device according to Embodiment 1 and Embodiment 2 of the present disclosure.
Figure 22B:
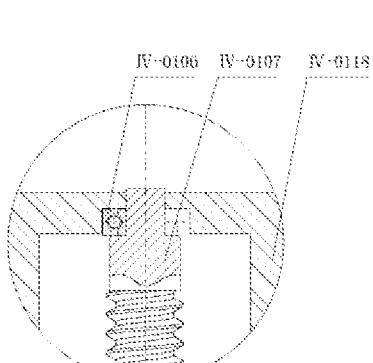
FIG. 22(b) is a partial enlarged view of vii in FIG. 22(a) according to Embodiment 1 and Embodiment 2 of the present disclosure.
Figure 22C:
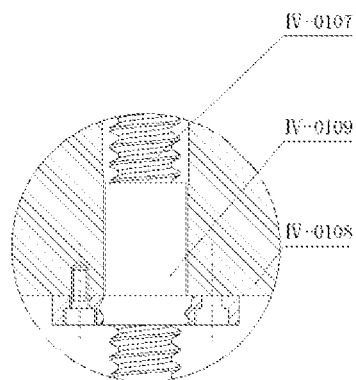
FIG. 22(c) is a partial enlarged view of viii in FIG. 22(a) according to Embodiment 1 and Embodiment 2 of the present disclosure.
Figure 22D:
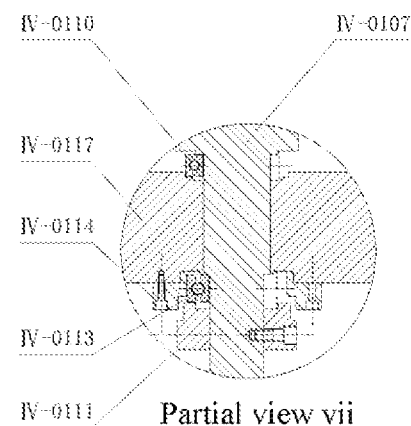
FIG. 22(d) is a partial enlarged view of ix in FIG. 22(a) according to Embodiment 1 and Embodiment 2 of the present disclosure.

The empty cutter heads in the storage tank are stored in a stereoscopic manner. In each process of feeding the empty cutter heads, a top cutter head filling area does not have cutter heads, and under the vertical jacking action of the cutter head jacking device IV-01, one cutter head in the storage tank can be fed to a working area. The lifting action of the cutter head jacking device IV-01 is mainly realized through the ball screw linear movement principle. High-speed feeding and micro-feeding of transmission can be realized by a ball screw, and the ball screw is suitable for micro-feeding of a cutter head jacking process in the device. In addition, in the transmission process, the axial rigidity is high, the precision is also high, meanwhile, the reversibility of transmission is achieved, the frictional loss is low, the transmission efficiency is high, and the energy is saved. The axonometric view of the device is as shown in FIG. 20, the exploded view of assembling components is as shown in FIG. 21, and a front view of the device with a guide track fixing rod top fixing plate IV-0122 removed is as shown in FIG. 22(*a*).

A lifting lead screw IV-0107 penetrates through the central hole of a lifting bottom plate IV-0117, a lead screw portion at the height position of the central hole is a plain shaft and a shaft shoulder is also designed. A lead screw far shaft end bearing IV-0110 is mounted at a first-stage shaft shoulder, a lead screw near shaft end bearing IV-0113 is mounted at a second-stage shaft shoulder, and the bearings are fixed through an axial positioning ring IV-0111 and a bearing mounting lantern ring IV-0114. The axial positioning ring is fixed to the plain shaft of the lead screw through a screw, the bearing mounting lantern ring is fixed to the lifting bottom plate IV-0117 through a screw, and an assembling relation is as shown in FIG. 22(*d*). The lowest end of the lead screw is connected to a lifting lead screw driving motor IV-0115 through a lifting motor coupling joint IV-0112, and the motor is fixed to the lifting bottom plate through a lifting lead screw driving motor fixing sleeve IV-0116. A lead screw upper end bearing IV-0106 is mounted at the shaft shoulder of the top end of the lead screw, the bearing is fixed in a bearing mounting hole of a lead screw axial fixing plate IV-0118, and as shown in FIG. 22(*d*), the lead screw axial fixing plate IV-0118 is mounted on the lifting bottom plate through screws. The lead screw rotates to drive a ball screw nut IV-0109 to move linearly, and then the linear movement is transformed into the vertical lifting motion. The ball screw nut is fixedly connected to a lead screw nut connecting block IV-0108 through screws. The connecting block is fixedly connected to a lifting table IV-0105 through a lifting table fixing plate IV-0102, and then the vertical movement of the ball screw nut drives the lifting table IV-0105 to complete lifting movement. The top end of the lifting table is connected to a cutter head jacking rack IV-0103 through a cutter head jacking rack connector IV-0104. In order to reduce the action force of the lifting table to the lead screw, the lead screw nut connecting block IV-0108 is fixedly connected to a guide track sliding block IV-0120 through a sliding block connecting rod IV-0101. Through the guide track sliding block, the integral rigidity of the device is improved, stress on the lead screw is reduced, and the device is prevented from being inclined.

Figure 32:
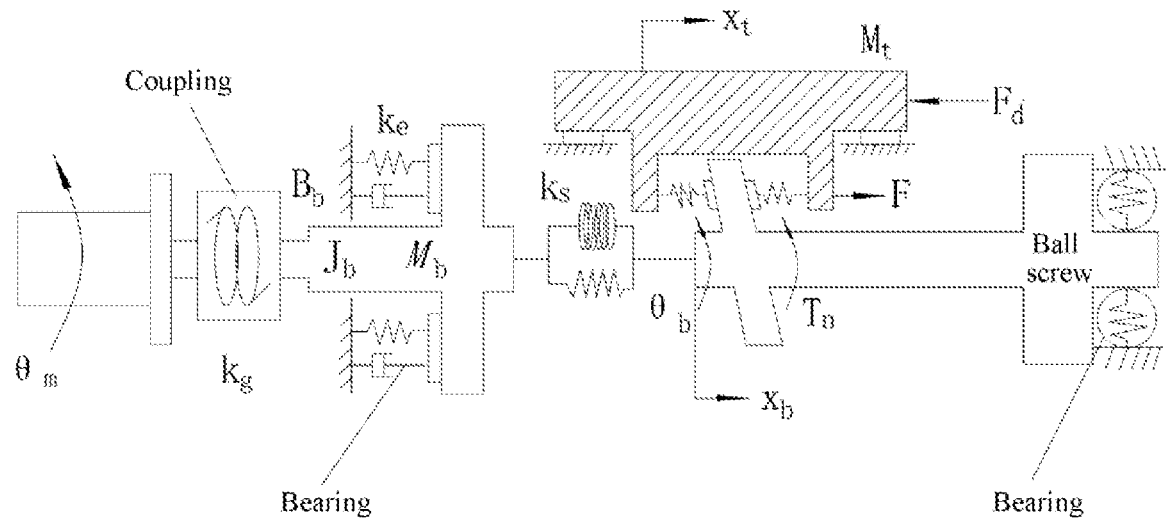
FIG. 32 is a schematic diagram of a mechanical model of a ball screw according to Embodiment 1 and Embodiment 2 of the present disclosure.

A dynamics model of a ball screw structure system is established, and then the dynamic characteristic of a ball screw feeding system is analyzed, revealing the mathematical relation of power and motion between different components. With the ball screw system in FIG. 22(*a*) as a research object, a system dynamics model is established through the abstraction of a physical model and the physical model per se, as shown in FIG. 32. Three degrees of freedom of motion are considered in the model synthetically, including a degree of freedom of rotation of the ball screw, a degree of freedom of axial movement of the ball screw and a degree of axial movement of the workbench; the rigidity of the components considered by the model includes the torsional rigidity of the coupling, the torsional rigidity of the ball screw, the axial tensile rigidity of the ball screw, the axial rigidity of the supporting bearing and the axial rigidity of the nut. The friction damping considered by the model includes axial friction force between the sliding block and the guide track, axial friction torque of the supporting bearing, friction torque of the lead screw nut, and axial viscous damping of the supporting bearing. According to the force transfer analysis results, the interaction force between the ball screw and the nut may be abstracted as an axial force F and a tangential torque $T_n$.

The system kinetic equation can be expressed as follows:

$$\begin{bmatrix} J_b & 0 & 0 \\ 0 & M_b & 0 \\ 0 & 0 & M_t \end{bmatrix} \begin{bmatrix} \ddot{\theta}_b \\ \ddot{X}_b \\ \ddot{X}_t \end{bmatrix} + \begin{bmatrix} k_g & 0 & 0 \\ 0 & k_{eq(x)} & 0 \\ 0 & 0 & 0 \end{bmatrix} \begin{bmatrix} \theta_b \\ X_b \\ X_t \end{bmatrix} = \begin{bmatrix} k_g \theta_m & -T_n & -T_{fN} \\ -F & -F_{fb} & F \\ F & -F_d & -F_{ft} \end{bmatrix}$$

where $J_b$ is the rotational inertia of the ball screw, $M_b$ is the mass of the ball screw, $M_t$ is the mass of the workbench, $\theta_m$ is the angular displacement of the motor, $\theta_b$ is the angular displacement of the ball screw, $X_b$ is the axial displacement of the ball screw, $X_t$ is the axial displacement of the workbench, $k_g$ is the equivalent torsional stiffness of the coupling and the ball screw, and $k_{eq(x)}$ is the equivalent axial stiffness of the ball screw and the supporting bearing, x is the effective working section rigidity of the lead screw, $T_{fN}$ is the sum of axial friction torques of the nuts of the supporting bearing, $F_d$ is the external load on the workbench, $F_{ft}$ is the axial friction force between the sliding block and the guide track, and $F_{fb}$ is the axial viscous damping force of the bearings. The value of $F_{fb}$ is $B_b X_b$, and $B_b$ is the axial viscous damping coefficient of the supporting bearing. The ball screw system dynamic model is combined with the maximum cutter head bearing weight in the cutter head discharging unit and the mass of the ball screw and the mass of the workbench to calculate and select the model of the ball screw and power output torque motor system components.

Figure 23:
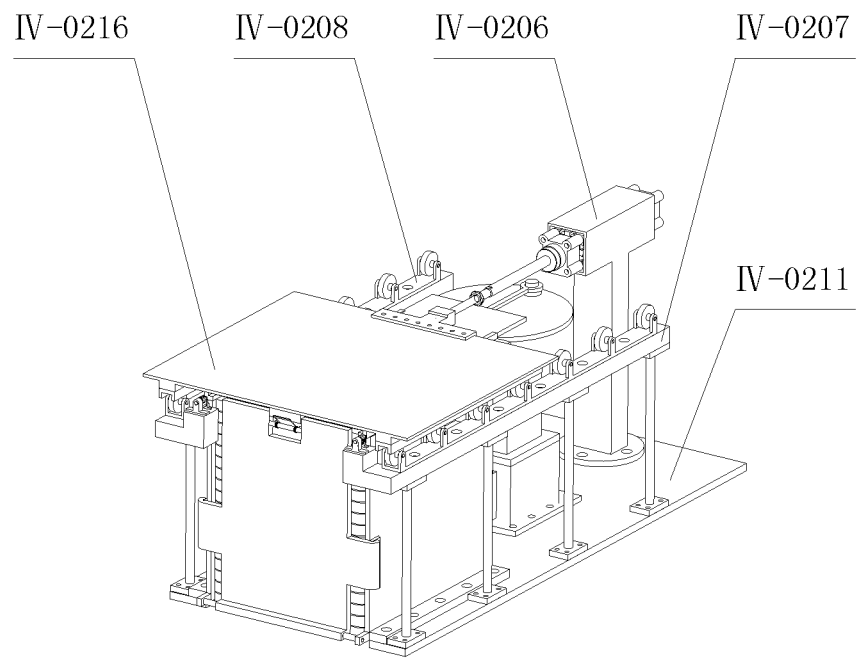
FIG. 23 is an axonometric view of a cutter head pushing device according to Embodiment 1 and Embodiment 2 of the present disclosure.
Figure 24:
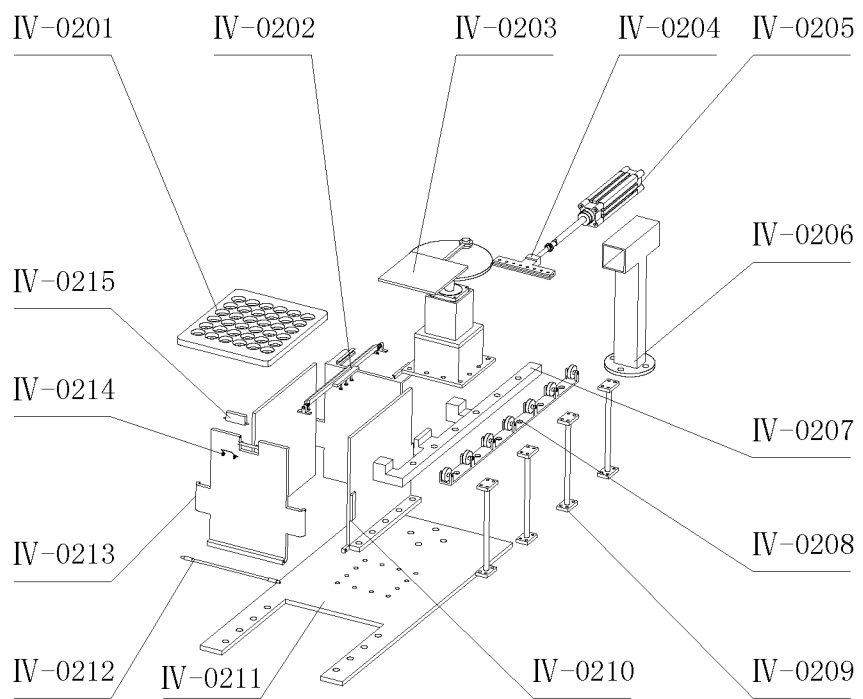
FIG. 24 is an exploded view of assembling components of the cutter head pushing device according to Embodiment 1 and Embodiment 2 of the present disclosure.

An axonometric view of the cutter head pushing device IV-02 is as shown in FIG. 23, and an exploded view of assembling components is as shown in FIG. 24. The falling and loading of the blades into the cutter head are completed by controlling the falling pull plate IV-0216, and the filled cutter head is pushed out by the cutter head discharging pushing device IV-0203, slides to the conveying belt through a cutter head discharging receiving plate II-09 and is conveyed to a specified storage position. The cutter head discharging pushing device drives a rotary disc to rotate through a motor, a boss is designed on the rotary disc and connected to a crank, the other end of the crank is hinged to a push plate, and the motor rotates to drive the crank to swing. Then the push plate is driven to linearly move under the action of a cutter head discharging push plate guide groove IV-021002 to impact the fully filled cutter head to consequently eject a cutter head discharging sliding stopper IV-0215, and meanwhile, the push plate restores to the initial position.

Figure 28:
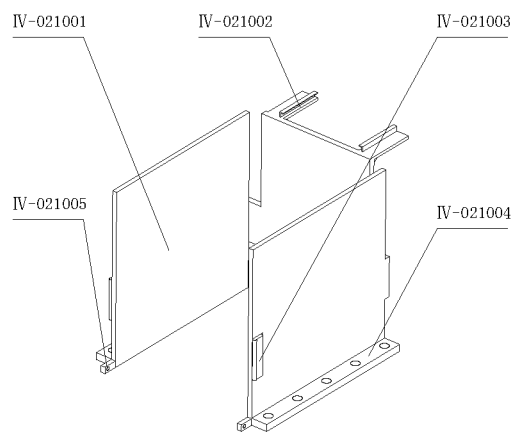
FIG. 28 is a view of a shell of a cutter head feeding box according to Embodiment 1 and Embodiment 2 of the present disclosure.
Figure 29:
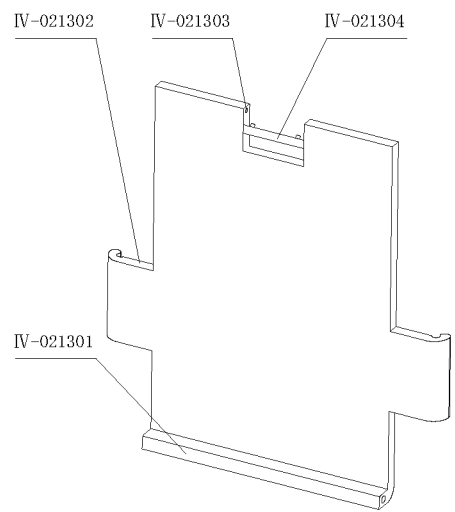
FIG. 29 is an axonometric view of a feeding plate according to Embodiment 1 and Embodiment 2 of the present disclosure.

The sliding stopper IV-0215 can rotate along the rotating shaft, and when the cutter head is discharged and after the stopper rotates by 90 degrees along the rotating shaft and the cutter head is pushed out, the sliding stopper automatically restores to the initial position under the action of a stopper resetting torsional spring IV-0214 as shown in FIG. 25(*b*). The cutter head push plate and the cutter heads in the blade loading working area are located at the same height. The two ends of the cutter heads in the blade loading working area are supported by a cutter head changing upward ejection rotating rod IV-0202. The upper end of the cutter head changing upward ejection rotating rod is the cutter head to be filled with the blades, and the lower end is an empty cutter head feeding storage tank defined by a cutter head feeding box IV-0210 as shown in FIG. 28 and a feeding plate IV-0213 as shown in FIG. 29. Empty cutter heads which are arranged in the height direction are placed in the empty cutter head feeding storage tank. Under the action of the cutter head jacking device IV-01, the cutter heads are fed, the feeding plate is buckled to the cutter head feeding box, and after all the cutter heads in the empty cutter head feeding storage tank are filled with the blades, the feeding plate IV-0213 is opened for adding cutter heads.

An exploded view of assembling components of the cutter head changing upward ejection rotating rod IV-0202 is as shown in FIG. 26. A cutter head feeding rotating rod IV-020204 is designed to be step-shaped, a shaft hole is designed in the end surface of the cutter head feeding rotating rod, and ratchet wheels IV-020202 are fixedly mounted at two ends of the cutter head feeding rotating rod through ratchet wheel fixing nuts IV-020205. The ratchet wheel and the rotating shaft are designed integrally, the other shaft end of the ratchet wheel is mounted on a ratchet wheel fixing seat IV-020201, and the ratchet wheel can rotate around a central axis. A ratchet wheel rotating stopper IV-020203 is mounted and designed at the lower end of the ratchet wheel, and the ratchet wheel rotating stopper is mounted on a ratchet wheel rotating stopper seat IV-020206;

Through the action of the ratchet wheel assembly, the following functions can be achieved: the cutter head changing upward ejection rotating rod can only rotate in one direction along the rotating shaft, so that when a cutter head to be filled is placed above the cutter head changing upward ejection rotating rod, due to the action of the ratchet wheel, the cutter head changing upward ejection rotating rod does not rotate under the action of gravity of the cutter head, thereby effectively supporting the cutter head. After the cutter heads in the working area are filled and are pushed out by a push rod, the cutter head jacking device IV-01 works to push the cutter heads accumulated to move upwards integrally. Then the cutter head a which is abutted against the lower end of the cutter head changing upward ejection rotating rod will rise, and thus, the bottom plate of the cutter head changing upward ejection rotating rod is stressed and rotates along the rotating shaft. The cutter head a keeps rising, after the upper surface of the cutter head is in contact with the falling pull plate IV-0216, jacking action stops, the cutter head jacking device IV-01 descends by a cutter head thickness height $h_0$, and the cutter head changing upward ejection rotating rod restores to the initial position under the action of the gravity of the cutter head and the spring resistance of a feeding rotating rod supporting seat IV-020207. The feeding rotating rod supporting seat IV-020207 is mounted in the middle of the cutter head changing upward ejection rotating rod, a damping spring is provided in the supporting seat, and the rotating rod plays a supporting role in a non-feeding state. When the cutter head feeding rotating rod rotates, the outer side of the rotating rod presses downwards in the rotating process, and at the moment, a spring of the feeding rotating rod supporting seat contracts to release a space needed by the rotation of the rotating rod.

Figure 27:
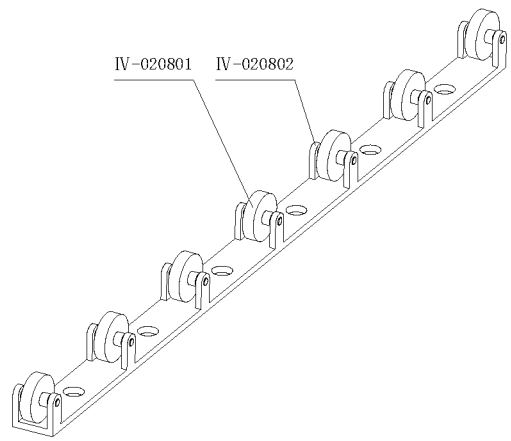
FIG. 27 is an axonometric view of a guide pulley according to Embodiment 1 and Embodiment 2 of the present disclosure.

The falling pull plate IV-0216 is driven by a pull plate electric telescopic rod IV-0205 to achieve closing and opening of the pull plate at a falling notch of the blade conveying tray carrier plate III-01. When the blade in the blade transition hole III-0301 is located at a working position, the control system sends an instruction, the falling pull plate IV-0216 is rapidly pulled out inwards under the telescopic driving effect of the pull plate electric telescopic rod IV-0205, and the blade in the blade transition hole III-0301 loses supporting and falls into the blade groove in the cutter head. The smaller the thickness of the falling pull plate IV-0216 is, the higher the pulling speed is, the less the transverse offset generated along the vertical axis in the blade gravity falling process is. On the contrary, the lower the pulling speed of the pull plate is, the slower the process of the blade losing the supporting of the pull plate is, the circumstance that the blade is inclined and overturned is possibly caused. Therefore, the pull plate is provided with a sliding groove, in the pulling process, under the action of a guide pulley IV-0208, the pull plate can be rapidly pulled out without inclination, and the guide pulley IV-0208 is connected to a guide pulley fixing plate IV-0207 through a screw as shown in FIG. 27. The bottom plate surface of the guide pulley fixing plate is fixedly supported on a cutter head pushing device bottom plate IV-0211 through a fixing plate supporting rod IV-0209. Components, which are in direct contact with the blades, of various working units of the loading machine are made of non-metal materials, and the hardness is low, so that the surface of the blade cannot be scratched in the blade loading process.

Embodiment 2

In another exemplary embodiment of the present disclosure, as shown in FIG. 1 to FIG. 33(*b*), a carbide blade cutter head filling method is provided and utilizes the carbide blade cutter head filling device in Embodiment 1.

The specific working and control process of the carbide blade cutter head filling device is as follows: after the device is initialized before working, the cutter head feeding conveying belt I-01 of the blade spiral vibration feeding unit I conveys the blade from the inside of the feeding box into the blade spiral vibration feeding tray I-02. The blade is conveyed from the inside of a tray into the conveying track under the vibration effect of the vibration tray, the blade conveying track is divided, at the division end, into the same number of blade conveying tracks as the blade guide rods, and a positioning stopper is mounted at the division end.

When conveyed to the division end, the blades in a horizontally placed pose can pass through a discharging port in the lower end of the positioning stopper and enters the conveying tracks, and the blades in other poses will fall into the feeding tray at the lower end under the action of the positioning stopper for refeeding. Under the vibration effect, the blade slips out of the track from the tail end of the conveying track, and threads through the guide rod through the inscribed circular hole of the blade, and the blades not threading through the guide rods are conveyed into the cutter head feeding conveying belt I-01 under the action of a blade collecting box for refeeding. The blades threading through the guide rods are conveyed into the blade storage device II-06 in cooperation with the time-sharing clamping effect of guide rod fixing clamps at the upper end and the lower end. A lower end discharging port of the blade storage device II-06 clings to the blade conveying tray III-03, and the blade conveying tray III-03 carries out left-right linear reciprocation movement. The leftward movement and rightward movement are each an independent working process. After the blade transition holes III-0301 in the blade conveying tray III-03 move horizontally and pass through the blade storage device II-06, the blade transition holes are fully filled with the blades. After the blade transition holes III horizontally move to a specified position of the falling pull plate IV-0216, the blades lose supporting and fall into the cutter heads close to the lower portion of the pull plate through rapidly pulling out the pull plate. After the blade conveying tray III-03 moves leftwards till the blades in the final group of blade transition holes III-0301 fall, the blade conveying tray starts to move horizontally rightwards under the reverse driving effect of a driving device to carry out blade loading operation of the cutter head discharging unit IV on the right side of the blade storage device II-06. Driving motors of various portions in the apparatus are connected to and controlled by the same motor controller. A motor driver is connected to an intelligent chip software control system, and sends a control instruction to the motor controller through the control system. Then the work sequence of movement components driven by the motor is controlled to meet the requirement of a blade loading work process.

Specifically, in conjunction with FIG. 1 to FIG. 33(*b*), a blade loading method for a blade gravity falling loading machine specifically includes the following steps:

Step one, the blade spiral vibration feeding unit is started, the blade is conveyed into the multi-track spiral vibration tray from the slope conveying belt feeding box, through the positioning block of a discharging port of the vibration tray, the blade is largely horizontally attached to the conveying track and conveyed to a discharging port at the tail end under the restraint effect of a track sliding groove.

Step two, reasonable vibration conveying parameters of the vibration tray are set. The guide rod fixing clamp at the upper end releases the guide rod, and thus the inscribed circular hole of the blade slipping out of a conveying port at the tail end threads through the guide rod. After the blade falls for a period of time, the vibration tray stops vibratory conveying, the guide rod fixing clamp at the upper end clamps the guide rod again, the guide rod fixing clamp at the lower end releases the guide rod, and thus, the blades which are accumulated on and thread through the guide rods enter the blade storage holes of the next unit under the effect of the guide rods. The guide rod fixing clamp at the lower end clamps the guide rod again, the guide rod fixing clamp at the upper end releases the guide rod, and the vibration tray continues to carry out vibratory feeding for blade falling of the guide rods.

Step three, the processes of the step one and the step two are repeated to keep enough blades to be loaded in a vertical channel of the blade storage device. In the process, the guide rod fixing clamp at the upper end and the guide rod fixing clamp at the lower end carry out time-sharing work to guarantee that the guide rod is always fixed at the working position.

Step four, as described in the step three, after there are enough blades to be loaded in the blade storage device, the blade loading unit starts to work, the blade conveying tray starts to do linear movement, and horizontally moves to pass through the blade storage device to fill the blade transition holes.

Step five, the blade conveying tray continues to move towards the working direction, and reaches a specified blade falling position. The blade carrier plate stops moving, the pull plate is pulled out, the blades lose supporting and respectively fall into rectangular grooves in the cutter heads to complete blade loading, and the falling pull plate resets.

Step six, the push plate pushes the cutter heads filled with the blades onto the conveying belt for cutter head discharging, and the cutter head jacking device jacks the empty cutter heads to a blade falling area.

Step seven, the blade carrier plate keeps moving, the step five and the step six are repeated, after one-way movement of the blade carrier plate is completed, the driving device drives the blade carrier plate to move reversely, and the cutter heads on the other side of the blade storage device are filled. Movement in two directions is continuously repeated to load the blades into the cutter heads of the left cutter head discharging unit and the right cutter head discharging unit.

The step one and the step two work in parallel with the step three and the step seven.

The foregoing descriptions are merely preferred embodiments of the present disclosure, but are not intended to limit the present disclosure. A person skilled in the art may make various alterations and variations to the present disclosure. Any modification, equivalent replacement, or improvement made and the like within the spirit and principle of the present disclosure shall fall within the protection scope of the present disclosure.

What is claimed is:

1. A carbide blade cutter head filling device, comprising a feeding unit, a storage unit, a loading unit and a discharging unit which are successively arranged, wherein an output end of the feeding unit is matched with an input end of the storage unit through a guide mechanism, an output end of the storage unit faces a conveying tray of the loading unit, the conveying tray is provided with a plurality of groups of transition holes for accommodating blades, a receiving mechanism for accommodating cutter heads is arranged below a falling pull plate of the discharging unit, and the falling pull plate adjusts communication and isolation between the plurality of groups of the transition holes and the cutter heads in the receiving mechanism by changing a relative position of the falling pull plate and the plurality of groups of the transition holes.

2. The carbide blade cutter head filling device according to claim 1, wherein the feeding unit comprises a feeding mechanism, a guide mechanism and a recycling mechanism which are matched with one another, an output end of the feeding mechanism is matched with a plurality of conveying tracks arranged in parallel, a first end of the guide mechanism faces a tail end of each of the plurality of the conveying tracks, a second end of the guide mechanism corresponds to the storage unit, and an opening of a recycling groove of the recycling mechanism faces a position where the each of the plurality of the conveying tracks is matched with the guide mechanism for receiving and recycling falling blades.

3. The carbide blade cutter head filling device according to claim 1, wherein the guide mechanism comprises a plurality of guide rods and a plurality of limiting clamps, wherein one end of each of the plurality of the guide rods away from the storage unit is matched with the output end of the feeding unit for receiving a blade and penetrates through a central hole of the blade, the each of the plurality of the guide rods is matched with at least two of the plurality of the limiting clamps, the plurality of the limiting clamps are successively arranged along the plurality of the guide rods at intervals, a temporary storage segment is formed between adjacent limiting clamps, the plurality of the limiting clamps clamp or release the plurality of the guide rods to stop or release the blades, and at the same moment, at least one of the plurality of the limiting clamps clamps one of the plurality of the guide rod.

4. The carbide blade cutter head filling device according to claim 1, wherein the storage unit comprises a storage device and a vibrator connected to the storage device, the storage device is provided with a plurality of passages matched with the guide mechanism, a cross-section shape of each of the passages is matched with that of a blade, a first end of the each of the plurality of the passages is matched with an output end of the guide mechanism, and a second end of the each of the plurality of the passages faces the conveying tray.

5. The carbide blade cutter head filling device according to claim 1, wherein the loading unit comprises a carrier plate, a conveying tray which is in sliding fit with the carrier plate and a guide mechanism matched with the conveying tray; and the conveying tray is matched with a reciprocating driving mechanism, the plurality of groups of the transition holes are successively arranged along a movement direction of the conveying tray, the guide mechanism is mounted on the carrier plate, and two sides of the conveying tray are respectively matched with the guide mechanism.

6. The carbide blade cutter head filling device according to claim 5, wherein the carrier plate is provided with a plurality of grooves matched with the falling pull plate, the conveying tray is in sliding fit with the falling pull plate, and the conveying tray moves to change a matching state of the plurality of groups of the transition holes and the falling pull plate for moving the plurality of groups of the transition holes to a position above the falling pull plate.

7. The carbide blade cutter head filling device according to claim 1, wherein the discharging unit comprises the receiving mechanism for accommodating the cutter heads, the falling pull plate being matched above the receiving mechanism, and a pushing mechanism being matched with the receiving mechanism, wherein the receiving mechanism is provided with a jacking module, an output end of the jacking module carries a plurality of the cutter heads which are stacked successively, the falling pull plate is matched with a telescopic module to drive falling and change a matching state of the falling pull plate and the cutter heads, and the pushing mechanism is arranged on one side of the receiving mechanism for pushing the cutter heads to be discharged from one side of the receiving mechanism.

8. The carbide blade cutter head filling device according to claim 7, wherein a discharging receiving plate is arranged on a side of the receiving mechanism away from the pushing mechanism, and the discharging receiving plate is opposite to the receiving mechanism for receiving the cutter heads discharged from the receiving mechanism.

* * * * *

UNITED STATES PATENT AND TRADEMARK OFFICE
CERTIFICATE OF CORRECTION

PATENT NO. : 12,172,249 B2  
APPLICATION NO. : 17/340945  
DATED : December 24, 2024  
INVENTOR(S) : Changhe Li et al.

Page 1 of 1

It is certified that error appears in the above-identified patent and that said Letters Patent is hereby corrected as shown below:

On the Title Page

Item (73) Assignees should read: QINGDAO UNIVERSITY OF TECHNOLOGY, Qingdao (CN); NINGBO SANHAN ALLOY MATERIAL CO., LTD., Ningbo (CN)

Signed and Sealed this  
Eleventh Day of March, 2025

Coke Morgan Stewart  
*Acting Director of the United States Patent and Trademark Office*